United States Patent
Singh et al.

(10) Patent No.: US 10,929,173 B2
(45) Date of Patent: *Feb. 23, 2021

(54) DESIGN-TIME INFORMATION BASED ON RUN-TIME ARTIFACTS IN A DISTRIBUTED COMPUTING CLUSTER

(71) Applicant: Cloudera, Inc., Palo Alto, CA (US)

(72) Inventors: Vikas Singh, San Jose, CA (US); Sudhanshu Arora, Sunnyvale, CA (US); Philip Zeyliger, San Francisco, CA (US); Marcelo Masiero Vanzin, San Francisco, CA (US); Chang She, San Francisco, CA (US)

(73) Assignee: Cloudera, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/667,609

(22) Filed: Oct. 29, 2019

(65) Prior Publication Data

US 2020/0065136 A1 Feb. 27, 2020

Related U.S. Application Data

(63) Continuation of application No. 15/808,805, filed on Nov. 9, 2017, now Pat. No. 10,514,948.

(51) Int. Cl.
  *G06F 9/46* (2006.01)
  *G06F 16/14* (2019.01)
  *G06F 16/21* (2019.01)

(52) U.S. Cl.
  CPC ............ *G06F 9/46* (2013.01); *G06F 16/211* (2019.01); *G06F 16/14* (2019.01)

(58) Field of Classification Search
  CPC ..................................................... G06F 9/46

USPC ..................................................... 718/1–108
See application file for complete search history.

(56) References Cited

U.S. PATENT DOCUMENTS

| | | | |
|---|---|---|---|
| 6,343,295 B1 * | 1/2002 | MacLeod | G06F 16/219 |
| 6,405,215 B1 | 6/2002 | Yaung | |
| 6,434,558 B1 * | 8/2002 | MacLeod et al. | G06F 16/284 |
| 6,842,906 B1 | 1/2005 | Bowman-Amuah | |

(Continued)

OTHER PUBLICATIONS

Vellaipandiyan, Solaimurugan, and P. Vignesh Raja. "Performance evaluation of distributed framework over YARN cluster manager." 2016 IEEE International Conference on Computational Intelligence and Computing Research (ICCIC). IEEE, 2016.pp. 1-5 (Year: 2016).*

(Continued)

*Primary Examiner* — Satish Rampuria
(74) *Attorney, Agent, or Firm* — Perkins Cole LLP

(57) ABSTRACT

Techniques are disclosed for inferring design-time information based on run-time artifacts generated by services operating in a distributed computing cluster. In an embodiment, a metadata system extracts metadata including run-time artifacts generated by services in a distributed computing cluster while processing a workflow including multiple jobs. The extracted metadata is processed to identify entities and entity relationships which can then be used to generate lineage information. Using the lineage information, the metadata system can infer design-time information associated with the workflow. The inferred design-time information can then be utilized to, for example, recreate the workflow, recreate previous versions of the workflow, optimize the workflow, etc.

28 Claims, 15 Drawing Sheets

(56) References Cited

U.S. PATENT DOCUMENTS

| | | | |
|---|---|---|---|
| 6,901,405 | B1 | 5/2005 | McCrady et al. |
| 7,493,570 | B2 * | 2/2009 | Bobbin ............... G06F 3/04842 |
| | | | 715/800 |
| 8,074,218 | B2 | 12/2011 | Ellam |
| 1,897,803 | A1 | 3/2015 | Goodson et al. |
| 8,978,034 | B1 * | 3/2015 | Goodson ................. G06F 16/21 |
| | | | 718/101 |
| 9,348,879 | B2 * | 5/2016 | Mohammad .......... G06F 16/254 |
| 10,514,948 | B2 | 12/2019 | Singh et al. |
| 2008/0072290 | A1 | 3/2008 | Metzer et al. |
| 2008/0209425 | A1 | 8/2008 | Ferris |
| 2012/0310875 | A1 * | 12/2012 | Prahlad ............... G06F 16/2465 |
| | | | 707/602 |
| 2016/0267082 | A1 * | 9/2016 | Wong .................... G06F 16/164 |

OTHER PUBLICATIONS

Ma, Shuangmei, and Zhengli Liang. "Design and implementation of smart city big data processing platform based on distributed architecture." 2015 10th International Conference on Intelligent Systems and Knowledge Engineering (ISKE). IEEE, 2015.pp. 428-433 (Year: 2015).*

Herodotou, Herodotos. "Towards a distributed multi-tier file system for cluster computing." 2016 IEEE 32nd International Conference on Data Engineering Workshops (ICDEW). IEEE, 2016.pp. 131-134 (Year: 2016).*

Dorn et al., "A survey of B2B methodologies and technologies: From business models towards deployment artifacts." 40th Annual Hawaii International Conference on System Sciences (HICSS '07), IEEE, 2007, pp. 1-10.

Lim et al., "Prospective and retrospective provenance collection in scientific workflow environments." IEEE International Conference on Services Computing, 2010, pp. 449-456.

Sheth et al., "Report from the NSF workshop on workflow and process automation in information systems." ACM SiGMOD Record 25.4, 1996, pp. 55-67.

Woodruff et al., "Supporting fine-grained data lineage in a database visualization environment," Proceedings 13th International Conference on Data Engineering, IEEE, 1997, pp. 91-102.

Cui et al., "Lineage tracing for general data warehouse transformations." The VLDB Journal—The International Journal on Very Large Data Bases 12.1, 2003, pp. 41-58.

Backes et al., "Data lineage in malicious environments." IEEE Transactions on Dependable and Secure Computing 13.2, 2015, pp. 178-191.

* cited by examiner

US 10,929,173 B2

DESIGN-TIME INFORMATION BASED ON RUN-TIME ARTIFACTS IN A DISTRIBUTED COMPUTING CLUSTER

CROSS-REFERENCE TO RELATED APPLICATION(S)

This application is a continuation of U.S. patent application Ser. No. 15/808,805, filed. Nov. 9, 2017, which is incorporated herein by reference in its entirety.

TECHNICAL FIELD

The present disclosure generally relates to distributed computing clusters and, more particularly, to collection, visualization, and utilization of data lineage in a distributed computing cluster.

BACKGROUND

Traditional data warehouse systems employ a "top down" or "schema on write" approach to collect and store data according to a predefined schema. A predefined schema can provide a logical structure to the data that can enable efficient reporting and analysis in some situations. However, a "schema on write" approach to data processing requires a substantial investment in initial planning and design to come up with the schema that will be utilized to organize the data. Effective planning and design will typically require comprehensive knowledge of the data to be collected, the users and organizations that will utilize the data, and the purposes and goals of using the data. As the scale of data being stored and processed continues to increase and the manner in which such data is used continues to evolve, data warehouse systems implementing a "schema on write" approach become increasingly more difficult to design, more cumbersome to manage, and more difficult to change to adapt to user needs.

A bottom up or "schema on read" approach differs from the "schema on write" approach used in traditional data warehouses in that the schema used to organize and process the data is only applied at the time of reading the data. In other words, structure is applied to otherwise unstructured data when it is read, for example, to query the data or perform other processing jobs. Large scale data technologies, such as Apache Hadoop™, typically employ this "schema on read" approach to allow users to effectively utilize large amounts of unstructured data without having to invest the time and effort to create a predefined schema for structuring the data when writing the data to storage. However, as the amount of data grows exponentially, there is a need for automatic collection, visualization, and utilization of upstream and downstream data lineage in these distributed database system (e.g., to verify the system's reliability or to further optimize or reconfigure the system).

DETAILED DESCRIPTION

Figure 1:
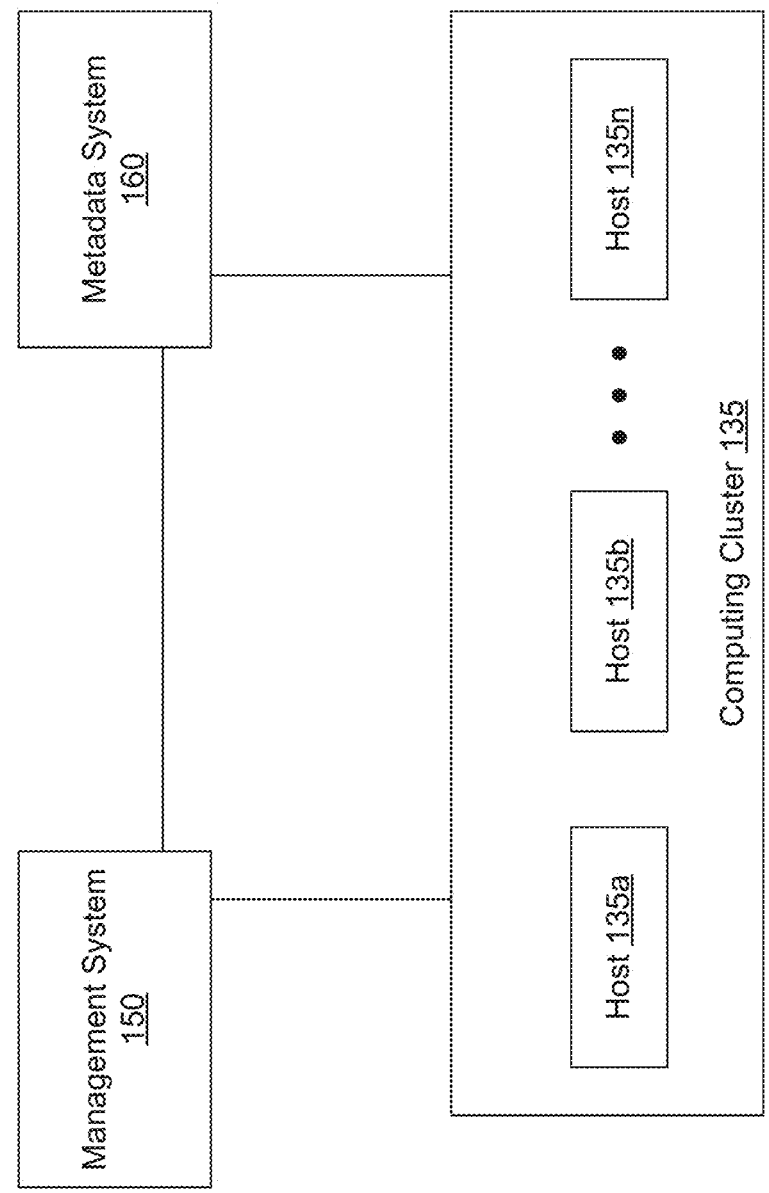
FIG. 1 is a block diagram illustrating an example operating environment in which a disclosed technique for inferring design-time information based on run-time artifacts can be implemented.

From the foregoing, it will be appreciated that specific embodiments of the invention have been described herein for purposes of illustration, but that various modifications may be made without deviating from the scope of the invention.

Overview

Implementing a bottom up or "schema on read" approach to data processing, for example, through the use of Apache Hadoop™, can allow users to gain effective insight from large amounts of their unstructured data relatively quickly. Such a system allows users to load their data in without predefined schema and perform work on the data. A drawback to this arrangement is that users are left with relatively little understanding of the data they have stored, the data used to return certain results, the structuring of data in returning certain results, and the operations performed to return certain results, etc. For example, a given workflow involved in the processing of data in a distributed computing cluster implementing a Hadoop™ architecture to return a result may involve a complex sequence of multiple data processing jobs executed on multiple data sets using multiple different services.

To address the challenges described above, a technique is introduced that enables automatic collection, visualization, and utilization of upstream and downstream data lineage in a data processing system, so as to provide users with visibility into the data processing system that utilizes a "schema on read" approach (e.g., Hadoop™). In some implementations, the collection, visualization and utilization can be based at least in part on operational metadata generated by the system when processing their data. For example, for each data source, the technique introduced here can show, down to the column level within that data source, what the precise upstream data sources were, the transforms performed to produce it, and the impact that data has on downstream artifacts. Additionally, a lineage diagram, which is a directed graph that depicts an extracted entity and its relations with other entities, can be displayed to users as an intuitive tool to further utilize, reuse, reconfigure, or optimize the existing data processing system.

Specifically, the embodiments introduced here can infer design-time information based on run-time artifacts. The term "design-time information" in this context refers to any information regarding the design of a system in general (e.g., computing devices, services, file systems, etc.) configured to store and process the data, the design of applications of the system (e.g., jobs, workflows, projects, etc.) to process data, and/or any other design-time information. For example, design-time information may include information on tables (and associated columns) utilized to structure the data, information on jobs (e.g., job resource objects) utilized to execute jobs on the data, information on workflows (e.g., job sequences, workflow definition objects, etc.) utilized to perform sequences of jobs, information on projects or applications that make use of the data processing, information on services utilized to process data, information on resources (e.g., physical devices, software, etc.) utilized to process data, etc. Again, in a system such as Hadoop™ implementing a "schema on read" approach, much of this information is not visible to the user. The user may load their data, define the result they are looking for, and the system may defines how to, for example, structure the workflow to arrive at the intended result. The term "run-time artifacts" generally refers to the metadata generated at the time of processing data (i.e., at run-time). In specific embodiments, the run-time artifacts are generated by services and/or entities involved in the processing of the data in a computing cluster. Examples of run-time artifacts include a log generated by a service implemented to process a job, a temporary table generated by a service to process the job, etc.

As is described further below, this process of inferring design-time information based on run-time artifacts opens up a number of possibilities to a user such as a data administrator or data scientist to more effectively manage their data and manage the manner in which the data is utilized. Example applications include recreating jobs or workflows (or multiple versions of jobs or workflows) based on the inferred design-time information, tracking the use of sensitive data such as personally identifiable information (PII), optimizing workflows, etc.

Example Operating Environment

FIG. 1 is a block diagram illustrating an example operating environment 100 in which the disclosed techniques for inferring design-time information based on run-time artifacts can be implemented. As shown in FIG. 1, the example operating environment includes a computing cluster 135, a management system 150, and a metadata system 160.

The computing cluster 135 may represent a logical entity that includes sets of host machines ("hosts") 135*a-n* that run instances of services configured for distributed processing of data. In an example embodiment, the computing cluster 135 may comprise an Apache Hadoop™ deployment. Apache Hadoop™ is an open-source software framework for reliable, scalable and distributed processing of large data sets across clusters of commodity machines. Examples of services include the Apache Hadoop™ Distributed File System (HDFS), MapReduce™, Apache Hadoop™ YARN, and/or the like. Services of the computing cluster 135 are described in more detail with respect to FIG. 2. A host (e.g., hosts 135*a-n*), as used herein, can include a physical and/or virtual machine that runs an instance of a role. As used herein, a role is a category of functionality within a service. For example, the Apache™ HDFS service can have the following example roles: a NameNode, a secondary NameNode, DataNode and balancer. In a distributed system such as computing cluster 135, one service may run on multiple hosts.

In some embodiments, a management system 150 is communicatively coupled to the computing cluster 135. The management system 150 can perform various roles for managing the operation of the computing cluster. For example, the management system 150 can be configured for installing software, configuring, starting, and stopping services in the cluster 135, and managing the hosts 135*a-n* of the cluster 135 on which the services run. Components of the example management system 150 are described in more detail with respect to FIG. 3.

In some embodiments, a metadata system 160 is communicatively coupled to the computing cluster and/or the management system 150. As will be described in more detail herein, the metadata system can be configured to extract metadata associated with the architecture and operation of the computing cluster 135 and provide certain analytics and insights based on that metadata. More specifically, the metadata system 160 can utilize extracted metadata to identify entities associated with the processing of data in the computing cluster 135 and the operational relationships between these entities. An "entity" in this context can include, for example, a file, a directory, a table, a script, a script execution, a query template, a query execution, a job template, a job execution, etc. The identified entities and entity relationships can, in some embodiments, be utilized to determine or trace the flow of information through the computing cluster. This flow of information is referred to herein as data lineage. For example, a data lineage for a piece of data source may indicate the upstream data sources and operations performed to produce it, and the impact that that data has on downstream artifacts. Components of the example metadata system 160 are described in more detail with respect to FIGS. 4A-4B.

The various systems shown in the example operating environment 100 may include one or more computing machines (physical and/or virtual) that comprise any combination of hardware and software configured to implement the various logical components described herein. For example, the one or more computing machines may include one or more memories that store instructions for implementing the various components described herein, one or more hardware processors configured to execute the instructions stored in the one or more memories, and various data repositories in the one or more memories for storing data structures utilized and manipulated by the various components. As an example, the one or more computing machines may include components such as those of example computer system 1100 described with respect to FIG. 11.

In some embodiments, the one or more computing machines of the various systems of example operating environment 100 may communicate with each other over one or more networks (not shown). The one or more networks may include any combination of networks over which data can be communicated. For example, the one or more networks may include LANs, WANs, cellular networks (e.g., LTE, HSPA, 3G, and other cellular technologies), and/or networks using any of wired, wireless, terrestrial microwave, or satellite links, and may include the public Internet.

Figure 2:
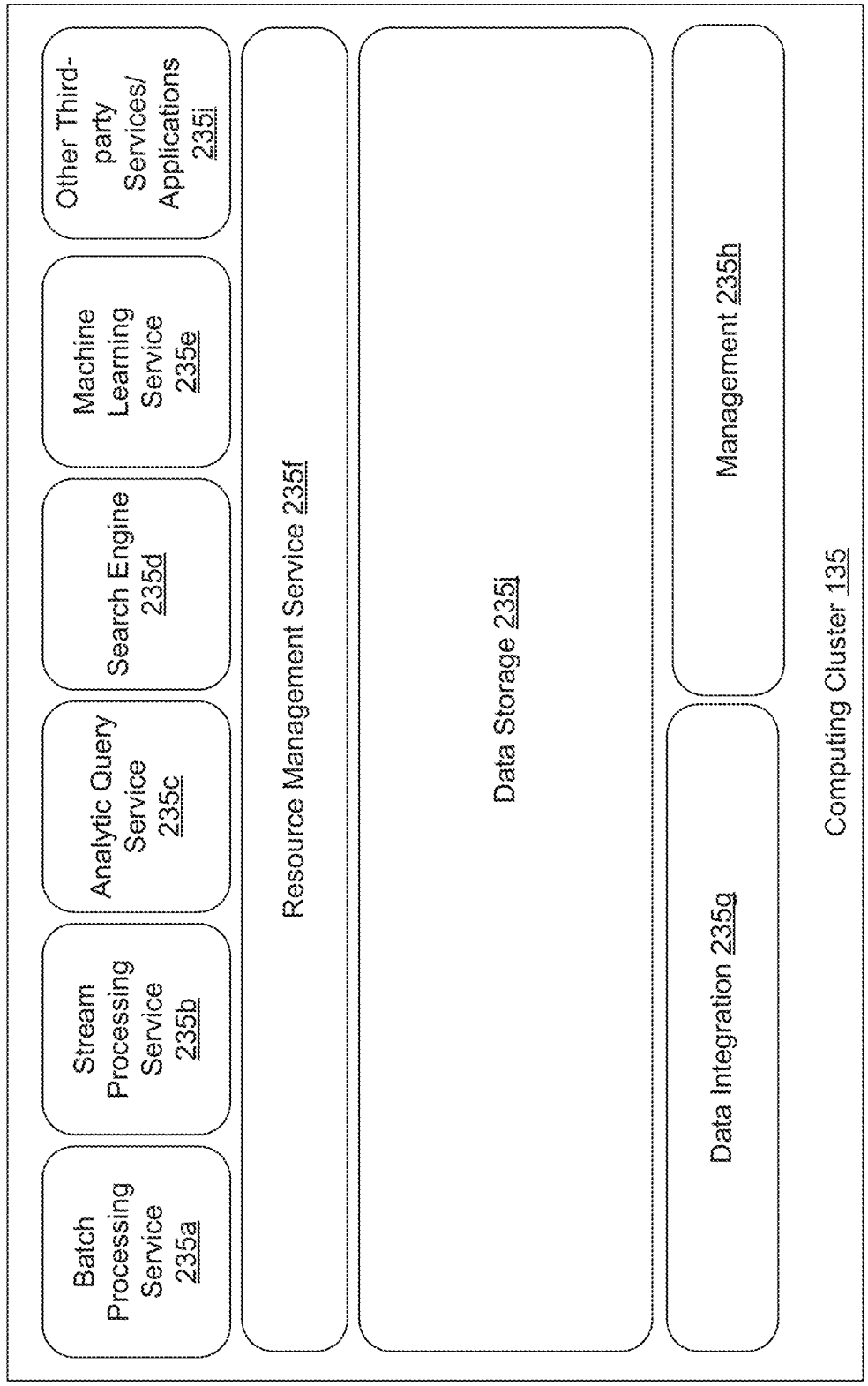
FIG. 2 is a block diagram showing some example services that may be deployed in a computing cluster.

FIG. 2 is a block diagram showing some example services that may be deployed in the computing cluster 135 described with respect to FIG. 1. Note that the term "services" is used herein uniformly for simplicity to refer to various components of the distributed computing cluster 135 described with respect to FIG. 2; however, one or more of the described "services" may include, for example, file systems (e.g., Apache™ HDFS), processing engines (e.g., MapReduce™, Apache Spark™, etc.), query interfaces (e.g., Apache Hive™), resource managers (e.g., Apache Hadoop™ YARN), and other types of components implemented in hardware and/or software. As shown in FIG. 2, the computing cluster 135 may include one or more batch processing services 235a (e.g., MapReduce™, Apache Hive™, Apache Pig™, etc.) one or more stream processing services 235b (e.g., Apache Spark™), one or more analytic query services 235c (e.g., Apache Impala™, etc.), one or more search engines 235d (e.g., Cloudera™ Search, etc.), one or more machine learning services 235e (e.g., Apache Spark™, MapReduce™, Apache Mahout™, etc.), one or more resource management services 235f (e.g., Apache Hadoop™ YARN), one or more data interface/integration services 235g (e.g., Apache Sqoop™), one or more management services 235h (e.g., part of or associated with the management system 150), and one or more other third party services and apps 235i. The computing cluster 135 also includes one or more storage services 235j for handling the storage of any type of data. The storage services 235j may include a distributed file system such as Apache™ HDFS, database frameworks such as Apache HBase™, Amazon™ S3, EMC etc. As previously mentioned, each of the one or more services described with respect to FIG. 2 may include instances running on multiple hosts 135a-n in the computing cluster 135. Further, each service may include multiple roles representing categories of functionality. For example, an Apache™ HDFS service may include the following roles: NameNode, secondary NameNode, DataNode, balancer. Accordingly, a given host of the multiple hosts 135a-n may include instances of a particular role associated with a given service. Returning to the example of the Apache™ HDFS service, one or more of the hosts 135a-n may include a respective role instance of the Apache™ HDFS service (e.g., DataNode_a, DataNode b, . . . DataNode_n).

Figure 3:
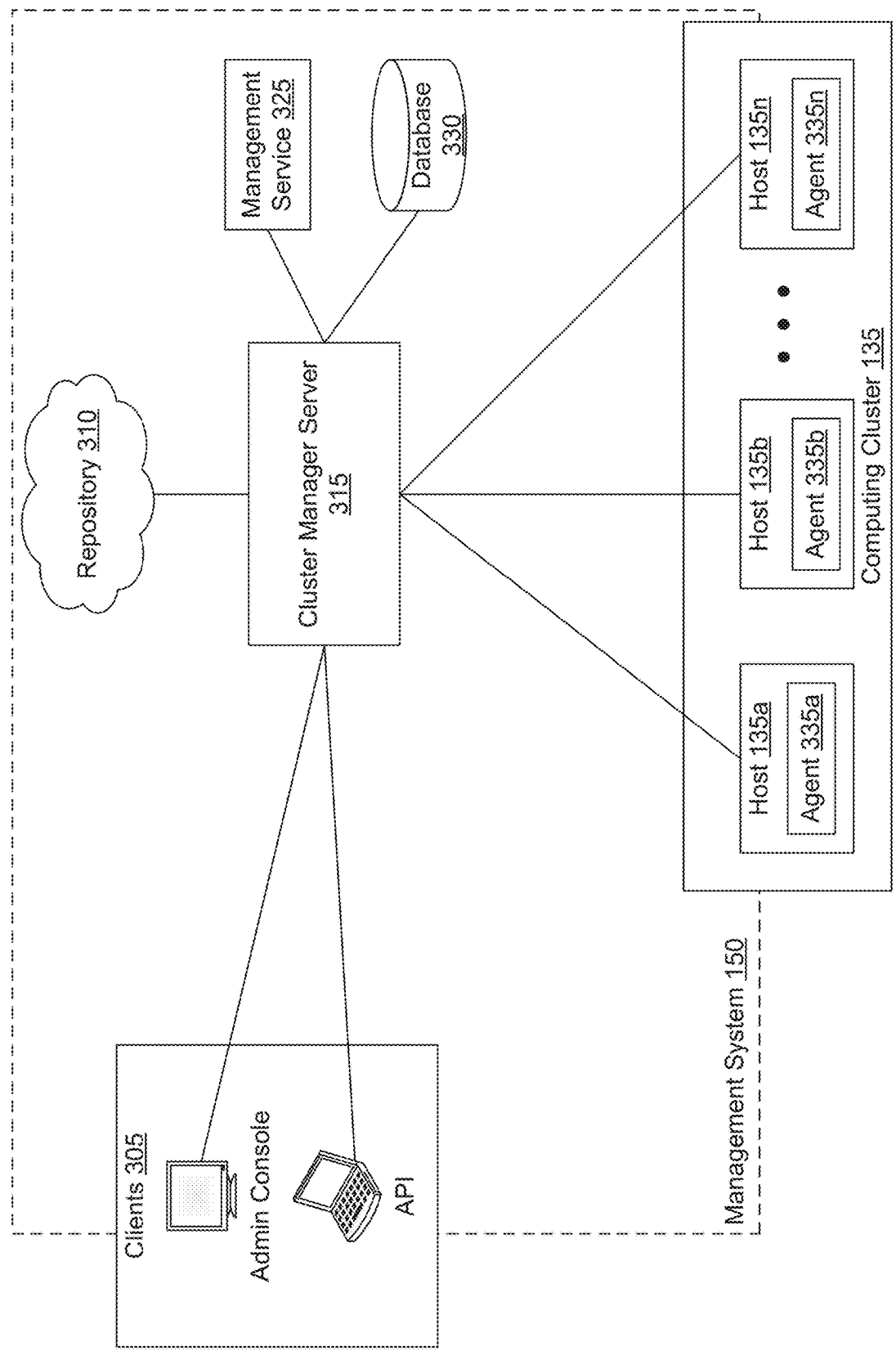
FIG. 3 is a block diagram illustrating an example management system.

FIG. 3 is a block diagram that shows the components of the example management system 150 described with respect to FIG. 1. In some embodiments, a cluster manager server 315 can be in communication with a management service 325 that consists of a set of roles, for example, an activity monitor, a host monitor, a service monitor, reports manager, and/or the like. Configuration information (e.g., cluster configuration information), monitoring information, and/or other information associated with the computing cluster 135 can be stored in a database 330. The database 330 can include multiple logical databases running across one or more database servers. In some embodiments, the client 305 represents an interface for interacting with the cluster manager server 315. The client 305 can include an admin console which may be a web-based user interface (UI) or graphical user interface (GUI) that an administrator ("admin") can use to interact with the cluster manager server 315 and manage one or more clusters (e.g., computing cluster 135). The client 305, in some embodiments, can also include one or more application programming interfaces (APIs) used by other applications to manage the cluster. Software for use in the computing cluster 135 can be stored in a repository 310 for distribution by the cluster manager server 315.

In some embodiments, each of the hosts 135a-n of the computing cluster 135 include an agent 335a-n for facilitating communication and coordination between processes running at the cluster manager server 315 and the multiple hosts 135a-n of the computing cluster 135. For example, the agent 335a-n may be responsible for starting and stopping processes, unpacking configurations, triggering installations, and monitoring the respective hosts 135a-n. Through communicating with the cluster manager server 315, the various agents 335a-n may facilitate the coordinated operation of multiple role instances of a given service of the computing cluster 135. Communication between the agents 335a-n and the cluster manager server 315 may be accomplished using heartbeats. For example, each of the one or more agents 335a-n may transmit a heartbeat signal at regular (e.g., every 15 seconds) or irregular intervals to the cluster manager server 315. With each heartbeat signal, an agent 335a-n may notify the cluster manager server 315 of its activities. The cluster manager server 315 may, in turn, respond with instructions on what activities the agent 335a-n should be performing. This exchange may include some type of reconciliation.

Figure 4A:
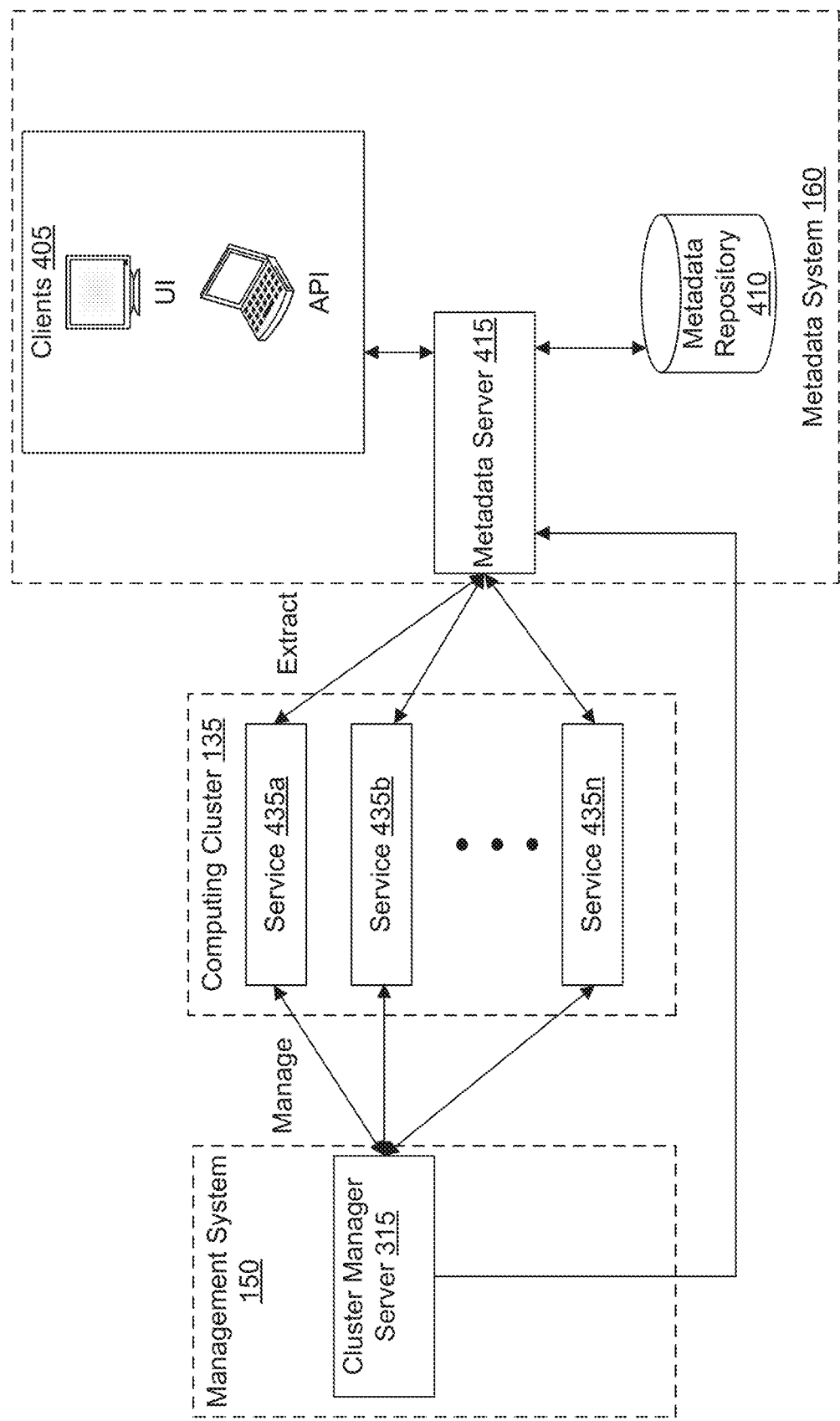
FIG. 4A is a block diagram that illustrates at a high level interaction between components of a metadata system with components of a distributed computing cluster and management system.

FIG. 4A is a block diagram that illustrates, at a high level, an example interaction between components of a metadata system 160 with components of the computing cluster 135 and management system 135. As discussed with respect to FIG. 3, the cluster manager server 315 operates to manage one or more services 435a-n operating in the computing cluster 135. The one or more services 435a-n shown in FIG. 4A may correspond with the services 235a-g described with respect to FIG. 2. The metadata system 160 operating in conjunction with the management system 150 may extract metadata from the one or more services 435a-n operating in the computing cluster. Specifically, in some embodiments, the metadata system 160 may include a metadata server 415 configured to perform various functions related to the collection, storage, analysis, and presentation of metadata from the computing cluster 135. For example, in some embodiments, the metadata server 415 communicates with the cluster manager server 315 to obtain information regarding the one or more services 435a-n operating in the computing cluster 135. Based on information obtained from the cluster manager server 315, the metadata server 415 may cause the extraction of metadata associated with entities managed by the one or more services 435a-n. Extraction of metadata may be continuous, in response to certain events, or at regular or irregular intervals. As part of the metadata extraction process, the metadata server 415 may also manage and apply various metadata extraction policies. The metadata server 415 then indexes and stores the extracted metadata into a metadata repository 410 that is accessible to clients 405 via services offered by the metadata system 160. To enable access by clients 405, the metadata server 415 manages user authorizations, performs analytic services (e.g., data lineage), and implements a user interface and/or API through which outputs (e.g., reports, visualizations, search results, etc.) generated based on the metadata can be accessed by clients 405. Note that although shown as a single entity in FIG. 4A, the metadata server 415 may represent multiple physical and/or virtual computing entities.

Figure 4B:
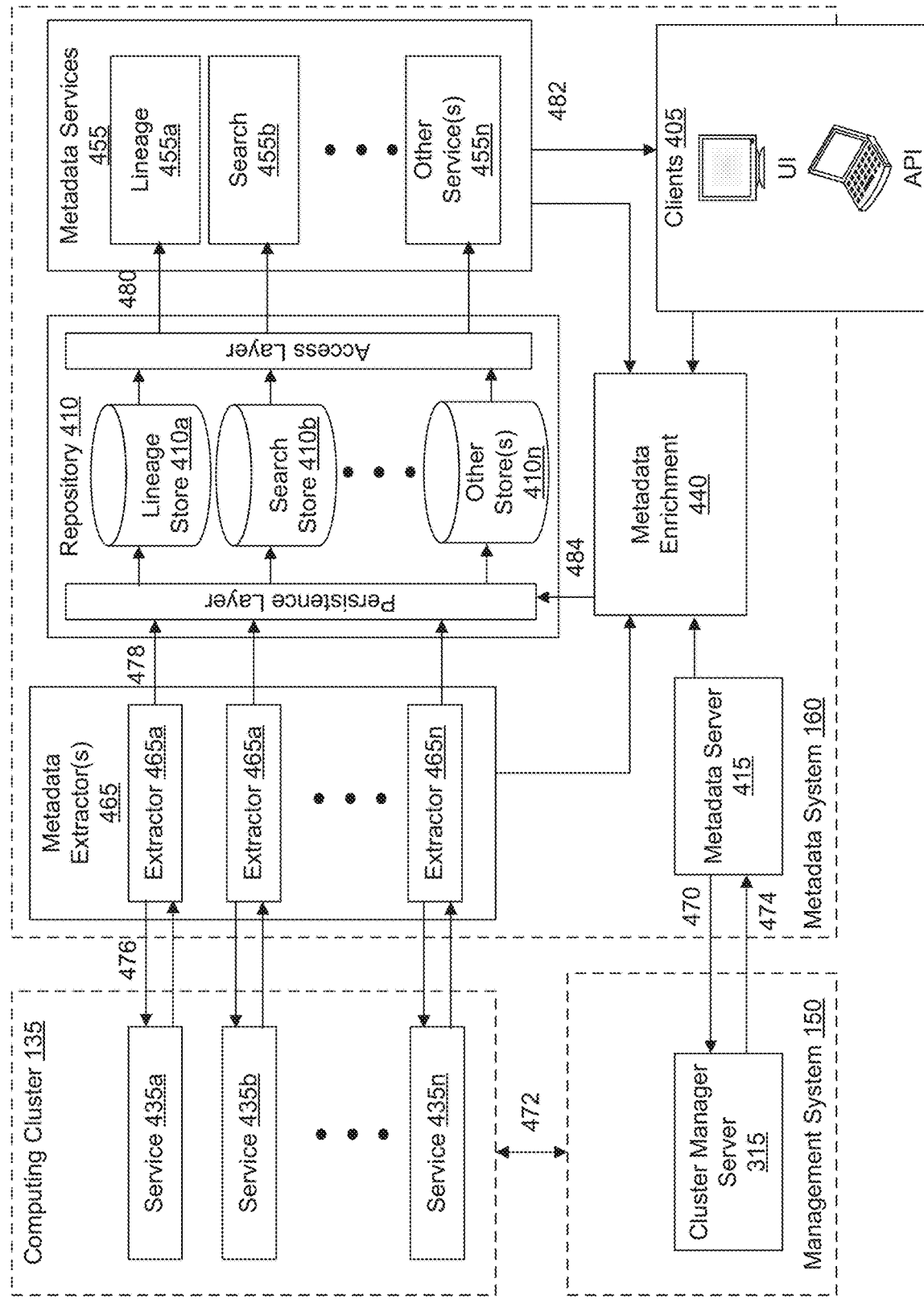
FIG. 4B is a block diagram that illustrates components of a metadata system as well as an example process flow for extracting, indexing, storing, and utilizing metadata.

FIG. 4B is a block diagram that shows the components of a metadata system 160 in greater detail as well as an example process flow involving the components of the metadata system 160. The process flow described with respect to FIG. 4B is provided for illustrative purposes and is not to be construed as limiting. Other embodiments may include process flows that include more or fewer steps, perform steps in a different order, or involve different system components while remaining within the scope of the present disclosure.

The example process begins at step 470 with the metadata server 415 contacting the cluster manager server 315 for information regarding the one or more services 435a-n operating in the computing cluster 135. Recall that the one or more services 435a-n may correspond with the services 235a-g described with respect to FIG. 2. Information regarding the one or more services 435a-n operating in the computing cluster 135 may include identification of the services operating (including specific service instances at the various hosts 135a-n in the cluster), parameters associated with the one or more services, a listing of the files stored in a data storage system 235i (e.g., Apache™ HDFS), and/or any other information regarding the computing cluster 135.

In some cases, the cluster manager server 315 may already have the information requested by the metadata service 415 stored in a database 330, for example, as described with respect to FIG. 3. Alternatively, or in addition, the cluster manager server 315 may request information from one or more of the services 435a-n, for example, by communicating, at step 472, with one or more of the agents 335a-n operating at the hosts 135a-n (respectively) in the computing cluster 135.

At step 474, the cluster manager server 315 returns the information associated with the one or more services 435a-n to the requesting metadata server 415. This process of retrieving, by the metadata server 415, information associated with the one or more services 435a-n may be performed at an initial setup stage, in response to events in the computing cluster 135, and/or at regular or irregular intervals. For example, in an embodiment, after an initial set-up stage, the metadata server 415 may continually (at regular or irregular intervals) receive updated information regarding the services 435a-n from the cluster manager server 314.

With the retrieved information associated with the one or more services 435a-n, the metadata server 415 may initiate the extraction of metadata from the one or more services 435a-n by one or more metadata extractors 465. The metadata extractors 465 may represent one or more processing entities operating in the metadata system 160 that are configured to request, receive, pull or otherwise extract metadata from the one or more services. For example, as shown in FIG. 4B, multiple extractor instances 465a-n may operate to, at step 476, extract metadata from the one or more services. Note that the metadata extractors 465a-n are depicted in FIG. 4B as separate from the metadata server 415 for illustrative clarity. However, this arrangement is not to be construed as limiting. The metadata extractors 465a-n may be separate from the metadata server 415 or may be part of the metadata server 415.

In the example depicted in FIG. 4B, each of services 435a-n is associated with a corresponding extractor process 465a-n. In such an embodiment, each extractor may be specifically configured (e.g., using information retrieved from the cluster manager server 315) to extract metadata from a particular service operating in the computing cluster 135. For example, extractor 465a may be an Apache Hive™ extractor specifically configured to extract metadata from an Apache Hive™ service 435a operating in the computing cluster 135. Note that the quantity of extractor entities 465a-n need not be the same as the quantity of services 435a-n. In some embodiments, a single extractor entity 465a-n may extract metadata from multiple services 435a-n and/or multiple extractor entities 465a-n may extract metadata from a single service 435a-n. As indicated by the bidirectional arrows at step 476, extraction of metadata may include pulling, by the extractors 465a-n, metadata from the services 435a-n and/or pushing, by the services 435a-n, metadata to the extractors 465a-n. Again, as discussed with respect to steps 470-474, the extraction of metadata at step 476 may be performed at an initial setup stage, in response to events in the computing cluster 135, and/or at regular or irregular intervals. For example, in an embodiment, after an initial set up stage, the extractors 465a-n may continually (at regular or irregular intervals) extract metadata from the services 435a-n as new metadata is generated.

The type of metadata extracted from the one or more services 435a-n may depend on the types or roles of the services 435a-n and/or the specific configuration of the metadata system 160. Examples of the type of metadata extracted from the one or more services 435a-n are described in the following paragraphs with reference to some of the example services 235a-j of FIG. 2.

One or more of the extractors 435a-n may be configured to extract metadata from a batch processing service 235a (e.g., Apache Hive™, Apache Pig™, or MapReduce™) associated with the computing cluster 135. In such an embodiment, extracted metadata may include database metadata, table metadata, query metadata, processing logs, processing scripts, etc. For example, in the case of Apache Hive™, the one or more extractors 435a-n may be configured to extract metadata from generated Apache Hive™ lineage logs. In the case of Apache Pig™, the one or more extractors 435a-n may be configured to extract metadata in the form of script runs from a job tracker or an application history server associated with Apache Hadoop™ YARN. Similarly, in the case of MapReduce™, the one or more extractors 435a-n may be configured to extract metadata from a job tracker or job history server associated with MapReduce™. In some embodiments, the one or more extractors 435a-n may be configured to extract batch processing service 235a metadata at an initial setup stage, in response to events associated with the batch processing service 235a (e.g., processing requests, processing completion, etc.), and/or at regular or irregular intervals.

One or more of the extractors 435a-n may also be configured to extract metadata from a stream processing service 235b (e.g., Apache Spark™, etc.) associated with the computing cluster 135. In such an embodiment, extracted metadata may include database metadata, table metadata, query metadata, processing logs, processing scripts, etc. In the case of Apache Spark™, the one or more extractors 435a-n may be configured to extract Apache Spark™ job metadata from Apache Hadoop™ YARN logs. In some embodiments, the one or more extractors 435a-n may be configured to extract stream processing service 235b metadata at an initial setup stage, in response to events associated with the stream processing service 235b (e.g., processing requests, processing completion, etc.), and/or at regular or irregular intervals.

One or more of the extractors 435a-n may also be configured to extract metadata from an analytic query service 235c (e.g., Impala™, etc.) associated with the computing cluster 135. In such an embodiment, extracted metadata may include database metadata, table metadata, query metadata, processing logs, processing scripts, etc. In the case of Impala™, the one or more extractors 435a-n may be configured to extract analytic query service 235c metadata from Impala™ daemon lineage logs. In some embodiments, the one or more extractors 435a-n may be configured to extract analytic query service 235c metadata at an initial setup stage, in response to events associated with the analytic query service 235c (e.g., submitted queries, completed query processing, etc.), and/or at regular or irregular intervals.

One or more of the extractors 435a-n may also be configured to extract metadata from a resource management service 235f (e.g., Apache Hadoop™ YARN) associated with the computing cluster 135. In such an embodiment, extracted metadata may include resource metadata (e.g., from hosts 135a-n), job metadata, processing logs, etc.). In the case of Apache Hadoop™ YARN, the one or more extractors 435a-n may be configured to extract resource management service 235f metadata from a resource manager associated with the computing cluster 135. In some embodiments, the one or more extractors 435a-n may be configured to extract resource management service 235f metadata at an initial setup stage, in response to events associated with the resource management service 235f (e.g., resource allocations, etc.), and/or at regular or irregular intervals.

One or more of the extractors 435a-n may also be configured to extract metadata from a data interface/integration service 235g (e.g., Apache Sqoop™) associated with the computing cluster 135. In such an embodiment, extracted metadata may include database metadata, table metadata, query metadata, processing logs, processing scripts, etc. In the case of Apache Sqoop™, the one or more extractors 435a-n may be configured to extract database and table metadata from an Apache Hive™ metastore server using an API and/or extract Apache Hive™ queries using Apache Hive™ lineage logs. In some embodiments, the one or more extractors 435a-n may be configured to extract data interface/integration service 235g metadata at an initial setup stage, in response to events associated with the data interface/integration service 235g (e.g., data ingestion, data extraction, etc.), and/or at regular or irregular intervals.

One or more of the extractors 435a-n may also be configured to extract metadata from a data storage service 235j (e.g., Apache™ HDFS, Apache HBase™) associated with the computing cluster 135. In such an embodiment the one or more extractors 435a-n would extract metadata from the data storage service 235j such as file listings, version information, storage type (e.g., NameNode, JournalNode, etc.), file creation time, file edit logs, checkpoint information, data storage system configuration properties, etc. In some embodiments, the one or more extractors 435a-n may be configured to extract data storage service 235j metadata at an initial setup stage, in response to events associated with the data storage service 235j (e.g., read, write, edit, delete, etc.), and/or at regular or irregular intervals. In a high availability Apache™ HDFS implementation, metadata may be extracted as soon as it is written to journal nodes.

As alluded to in the previous paragraphs, the manner in which metadata is extracted may depend on the types of services 435a-n implemented in a given computing cluster 135. Accordingly, to facilitate the extraction of metadata, the cluster manager server 315 and/or metadata server 415 may take over control of the generation of at least some of the metadata generated by any one or more of the services 435a-n. Specifically, the cluster manager server 315 and/or metadata server 415 may specifically define the type and format of the metadata generated so as to coincide with the requirements of a given implementation of the metadata system 160. Again, the requirements of the metadata system 160 may differ, for example, based on user preferences, the configuration of the management system 150, and/or the configuration of the computing cluster 135. As an illustrative example, the cluster manager server 315 and/or metadata server 415 may configure Apache Hive™ such that specific information is stored in a log file in a specific format in response to detecting the submission of a query. As mentioned above, this process of taking over at least some control of the generation of metadata by the one or more services 435a-n may be performed by the cluster manager server 315 and/or metadata server 415. In some embodiments, any one of these two entities may handle the entire process. In some embodiments, the two entities may coordinate with each other. For example, the metadata server 415 may transmit metadata requirements to the cluster manager server 315 which interprets the requirements and takes over at least some control of the generation of metadata by the one or more services 435a-n so as to satisfy the requirements. In some embodiments, a processing entity (e.g., software code) originating from the metadata system 160 may be instantiated at the cluster manager server 315 (or some other component of the management system 150) to take over at least some control of the generation of metadata by the one or more services 435a-n.

Metadata extracted by the one or more extractors 465a-n is then indexed and stored at step 478. Indexing and storage of the extracted metadata enables the metadata to be accessed, for example, for processing and/or search by one or more services 455 of the metadata system 160. In some embodiments, multiple types of metadata are indexed such as identified entities, entity properties, and identified relationships between entities.

The term "entity" in this context refers to any type of entity that is involved in the storage and/or processing of data in the computing cluster 135. The entities may be identified and utilized for indexing based on the metadata extracted from the computing cluster 135. Examples of entities may include files (e.g., Apache™ HDFS files), directories (e.g., Apache™ HDFS directories), tables (e.g., Apache Pig™, Apache Hive™, and Apache Impala™ tables), scripts (e.g., Apache Pig™ scripts), script executions (e.g., Apache Pig™ script executions), query templates (e.g., Apache Hive™ and Apache Impala™ query templates), query executions (e.g., Apache Hive™ and Apache Impala™ query executions), job templates (e.g., Apache Spark™, MapReduce™, Apache Hadoop™ YARN, Apache Sqoop™, and Apache Oozie™ job templates), job executions (e.g., Apache Spark™, MapReduce™, Apache Hadoop™ YARN, Apache Sqoop™, and Apache Oozie™ job executions), devices (e.g., host devices, client devices, etc.), users (e.g., client users, administrative users, etc.), addresses, and any other entities that may be associated with the storage and/or processing of data in the computing cluster 135.

Entity properties may refer to any type of properties associated with entities. Examples of entity properties include name, description, group, owner, type, operation type, source, timestamp, etc. As an illustrative example, an Apache™ HDFS file entity may include the following entity properties: file identifier, file system path, permissions, size, replication state, date, owner, etc. As another illustrative example, a MapReduce™ job execution entity may include the following entity properties: job identifier, mapper class identifier, output key identifier, output value, reducer class identifier, etc. As another illustrative example, an operation entity may include the following properties: input (e.g., a file, a directory, a table, etc.), output (e.g., a file, a directory, a table, etc., operation type (e.g., transform, join, etc.), operation engine type (e.g., MapReduce™ Apache Spark™, etc.).

Relationships between entities may include any type of logical connection between entities such as a data flow relationship, a parent-child relationship, logical-physical relationship, instance relationship, control flow relationship, etc. A data flow relationship may be identified where there is some type of relationship in the data and/or processing activity between entities. An illustrative example of a data flow relationship is the relationship between a file and a MapReduce™ job executed to process data of the file. A parent-child relationship refers to some type of hierarchical relationship between entities. An illustrative example of a parent-child relationship is the relationship between a file and a directory. A logical-physical relationship refers to any type of relationship between a logical entity and a physical entity. An illustrative example of a logical-physical relationship is the relationship between an Apache Hive™ query and a MapReduce™ job executed as part of the Apache Hive™ query execution at a particular host. An instance relationship refers to instance relationships between otherwise related entities. An illustrative example of an instance relationship is the relationship between a query template and a query execution instance. Another illustrative example of an instance relationship might be the relationship between a file and the multiple version instances (e.g., current and historical versions) of that file. A control flow relationship refers to a relationship between entities in which one entity exerts some level of control over another entity. For example, in the context of data flow a source entity might controls the flow of data to a target entity. An illustrative example such a relationship might be the relationship between columns in an "insert" clause in an Apache Hive™ query (i.e., data source) and columns in a "where" clause of the same Apache Hive™ query (i.e., data target).

In some embodiments, at least some of the extracted metadata (indexed or not) may be stored in one or more data stores 410a-n comprising the repository 410. For example, the example embodiment depicted in FIG. 4B shows a lineage store 410a, a search store 410b, and one or more other data stores 410n. In this example, the one or more data stores may include metadata that can be accessed at step 480 by one or more services 455 associated with the metadata system 160, for example, to provide outputs at step 482 to clients 405 (e.g., via a user interface (UI) or an application programming interface (API)). As shown in FIG. 4B, a lineage service 455a may access metadata stored in a lineage store 410a, for example, to generate and output data lineage diagrams (i.e., visualizations) to clients 405. Similarly, a search service 455b may access metadata stored in a search store 410b to process queries from clients 405 and return query results containing relevant metadata at step 482. Other services 455n may include workflow analysis services, workflow recreation services, workflow optimizer services, etc.

Note that the architecture shown in FIG. 4B is an example provided for illustrative purposes and is not to be construed as limiting. For example, in some embodiments, the one or more services 455a-n may simply access a single data store containing all the stored metadata. Also, some embodiments may not include all of the services depicted in FIG. 4B such as lineage 455a and search 455b. Further, the multiple services 455a-n are depicted in FIG. 4B as separate from the metadata server 415 for illustrative clarity. However, this arrangement is not to be construed as limiting. The metadata services 455a-n may be separate from the metadata server 415 or may be part of the metadata server 415.

In some embodiments, the metadata stored at repository 410 may be further supplemented at step 484 with additional metadata gathered through a metadata enrichment process 440. Supplemental metadata added to the metadata extracted from the one or more services 435a-n may originate from user inputs received via clients 405, the metadata server 415, the extractors 465a-n, and/or the metadata services 455a-n. For example, extractors 465a-n with knowledge of the entities present in the computing cluster 135 may add tags indicative of entity associations and/or relationships to pieces of metadata extracted from the one or more services 435a-n. In other words, the data enrichment process 440 may include parsing the raw metadata (e.g., a machine generated log file), identifying express or implied entities and entity relationships in the parsed raw metadata and creating additional metadata extractions (e.g., the entities, entity relationships, etc.) on top of the raw metadata. As an illustrative example, metadata in the form of a query log extracted from Apache Hive™ may be enriched upon extraction (e.g., by one or more extractors 465a-n) with tags indicative of the entities associated with a particular Apache Hive™ query (e.g., tables, query templates, query executions) as well as the relationships between the entities (e.g., the instance relationship between a query template and a particular instance of a query execution resulting in the query log). Note that in some embodiments, the metadata enrichment process 440 may not actually alter the underlying raw metadata extracted from computing cluster 135 so as to avoid any loss in information. In such embodiments, the metadata abstractions added as part of the enrichment process may be stored along with or separately form the raw extracted metadata (e.g., in a separate data store).

Inferring Design-Time Information Based
Run-Time Artifacts

Figure 5:
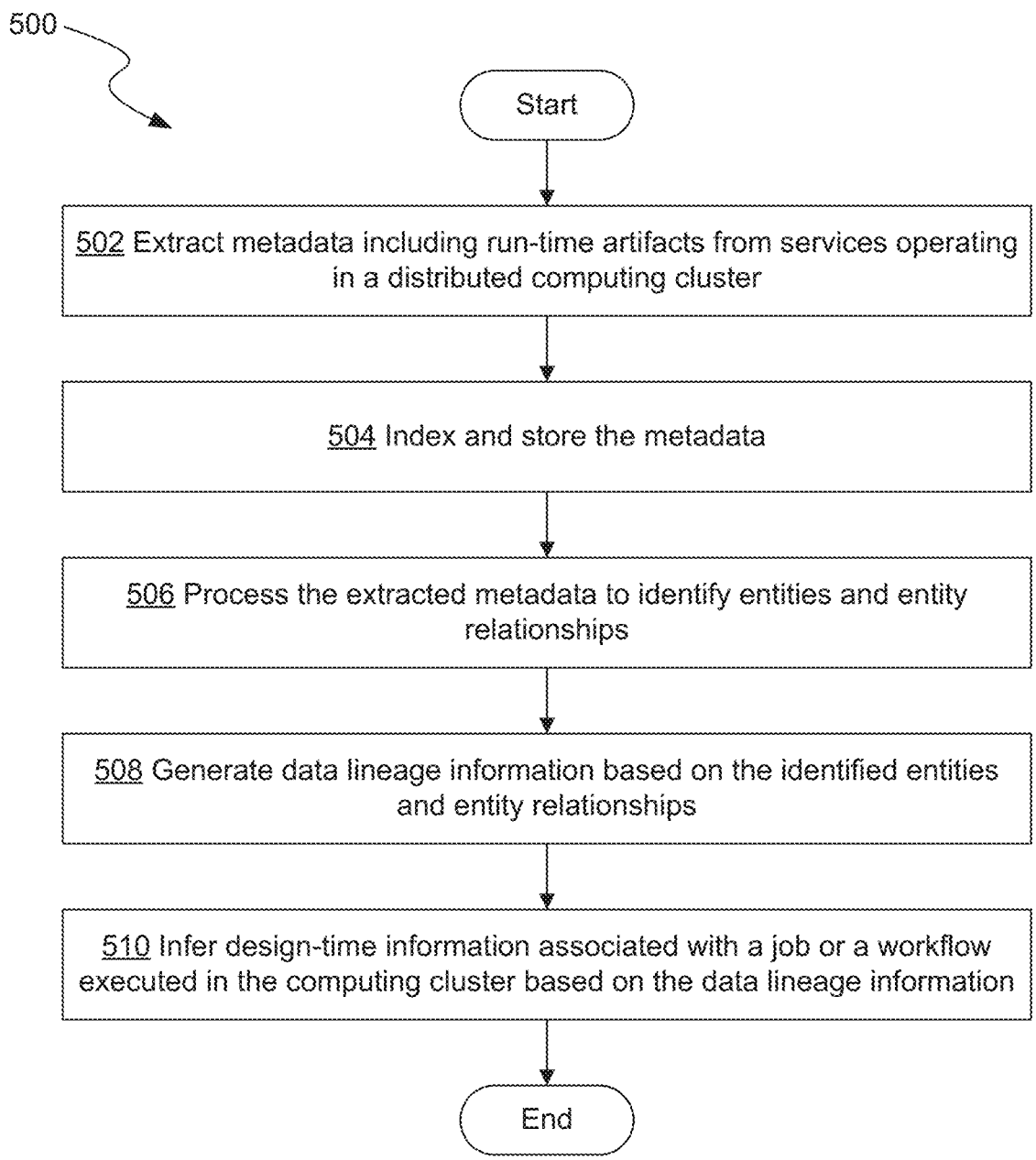
FIG. 5 is a flow chart that describes an example process for inferring design-time information based on run-time artifacts.

FIG. 5 shows a flow chart describing an example process 500 for inferring design-time information based on run-time artifacts. The example process is 500 is described with respect to the example system architecture depicted in FIG. 4B. A person having ordinary skill will recognize that the architecture of the system may differ in other embodiments. One or more steps of the example process 500 may be performed by any one or more of the components of the example processing system 1100 described with respect to FIG. 11. For example, the example process 500 depicted in FIG. 5 may be represented in instructions stored in memory that are then executed by a processing unit. The process 500 described with respect to FIG. 5 is an example provided for illustrative purposes and is not to be construed as limiting. Other processes may include more or fewer steps or may perform steps in a different order than depicted in FIG. 5 while remaining within the scope of the present disclosure.

The example process 500 begins at step 502 with receiving metadata from one or more services 435a-n operating in a distributed computing cluster 135. As previously discussed, the metadata may be received as part of a metadata extraction process involving one or more extractor entities 465a-n associated with a metadata system 160. The extracted metadata may include operation metadata in the form of or based on run-time artifacts generated by the one or more services 435a-n as the one or more services 435a-n process (i.e., execute) a job or a workflow involving a sequence of multiple jobs on data stored in the computing cluster. As previously mentioned, a "run-time artifact" refers to any type of data generated by entities (e.g., services 435a-n) during the processing of data in the distributed computing cluster 135 (i.e., at run-time). Some illustrative examples of run-time artifacts may include operational logs, table metadata, query metadata, job execution metadata, script execution metadata, etc.

The example process 500 continues at step 504 with indexing and storing the extracted metadata in a repository 410 as described with respect to FIG. 4B. As further described with respect to FIG. 4B, the step of indexing and storing the metadata may include or be associated with, at step 506, processing the extracted metadata to identify entities (e.g., files, directories, tables, scripts, script executions, query templates, query executions, job templates, job executions, etc.) involved in the run-time processing of data (i.e., execution of jobs and workflows) in the distributed computing cluster 135 and identifying entity relationships (e.g., data flow, parent-child, logical-physical, instance of, control flow, etc.). In some embodiments, extracted metadata indexed according to identified entities and entity relationships can be stored in two separate data stores (collectively part of repository 410). A first data store may include information associated with nodes in a graph representing identified entities while a second data store may include information associated with edges in the graph representing identified relationships between identified entities.

The identification of entities (and their associated properties) may be based on express identifiers occurring in the metadata and/or implied based on any other information included in the metadata. For example, an identifier associated with a particular table may show up in the run-time metadata generated by any one or more of the services 425*a-n* performing operations on the particular table. As another example, a job template entity may be inferred based on job parameters showing up in the run-time metadata generated by one or more of the services 425*a-n* executing the job. Similarly the identification of entity relationships may be based on express identifiers included in the metadata or may be implied based on information included in the metadata. For example, directory metadata received from a data storage system (e.g., Apache™ HDFS) associated with the computing cluster 135 may expressly call out parent-child file relationships. As another example, a data flow relationship between entities may be implied, for example, based on temporal proximity. Consider, for example, a first job execution with properties A (executed at time t1), a second job execution with properties B (executed at time t1), and a third job execution with properties C (executed at time t1). Without further information, the three jobs may appear unrelated; however, upon analyzing the entity properties of the three jobs, some type of entity relationship may be implied. For example, the three jobs may represent multiple instances of the same job (as evidenced by corresponding properties). Alternatively, the three jobs may have a data flow or control flow relationship in which the jobs are performed in sequence according to a workflow.

In some embodiments, additional information is added to the identified entities and entity relationships at the metadata ingestion stage, for example, to facilitate lineage generation (see step 508). For example, information associated with a particular entity may be added as labels (or some other type of data) to a node corresponding to the particular entity that is stored in repository 410. In an example embodiment, identified entities are assigned entity levels based on their entity type. For example, top level parent entities may be assigned as a first or default entity type, child entities that have a parent may be assigned as a second entity type, and entities that involve a "mini lineage" such as scripts and workflows may be assigned as a third entity type. Again, the manner in which entities are classified will depend on the requirements of a given implementation. In some embodiments, information regarding entity relationships can be added to identified entities. For example, if an entity is a template and has an instance relationship with one or more other entities representing instances of the template, information associated with the instance children (e.g., entity identifiers) may be added to the template entity and vice versa. As another example, if an entity data flow relationship to one or more other entities, information indicative of the data flow may be added to the entities. For example, information indicating that a downstream entity exists (e.g., a target entity identifier) may be added to source entities, while information indicating that an upstream entity exists (e.g., a source entity identifier) may be added to target entities. Again, the manner in which entity relationships are indicated for identified entities will depend on the requirements of a given implementation.

The example process 500 continues at step 508 with generating data lineage information based on at least some of the identified entities (and associated entity properties) and the identified relationships between entities. Data lineage generally refers to a representation of the path of data through a data processing system. More specifically, data lineage can refer to the path of data through a plurality of entities associated with the data processing system. Data lineage may describe, for example, the source of data, the type of data, operations performed on the data, movements of the data, etc. Consider again the architecture described with respect to FIG. 4B. In response to a lineage request, a process may traverse the graph (stored in repository 410), including the multiple nodes and edges linking the nodes to generate lineage information associated with one or more entities. In some embodiments, this lineage information may be utilized to generate and display data lineage diagrams via a UI of a client 405. FIGS. 10A-10D show some example data lineage diagrams that help to illustrate the concept of data lineage. Notably, this process of generating data lineage information by traversing the graph can be performed without editing, transforming, or otherwise altering the underlying raw and/or indexed metadata.

The logic applied to traverse the graph to generate lineage information can depend on one or more predefined rules. In an illustrative embodiment, a lineage process begins with creating of identifying a set of one or more "seed entities" from the set of entity nodes in a stored graph in the metadata system 160. The "seed entities" in this context may be any of the identified entities and are based on the specifics of the lineage request. As an illustrative example, a lineage request configured to track data lineage stemming from a submitted query may include an identifier associated with the query execution entity. Based on the identifier included in the lineage request, certain related entities (e.g., related instances, parents, etc.) may be retrieved as seed entities. Again, the particular entities retrieved as seed entities may depend on the type entities identified in the lineage request and/or the rules established for the given system implementation.

Beginning with the retrieved seed entities, a lineage process may continue with retrieving one or more entity relationships associated with the seed entities. As previously mentioned, in some cases, the entity relationships are stored in repository 410 as edges of a graph. In some embodiments, the lineage process is specifically configured to retrieve flow relationships (e.g., data flow and/or control flow) to and from entities such as directories and/or retrieving all child or partial entity relationships. These steps for retrieving entity relationships can be performed both upstream and downstream from the seed entities.

In some embodiments, certain rules may be applied to clean up or streamline the generated lineage information, such as avoiding traversing entities that do not directly participate in a particular lineage, avoiding traversing files for tables (unless the lineage is based on a file entity), specifically following relationships from templates for specific services such as Apache Hive™ or Apache Impala™, discarding redundant relationships between common entities, etc. For example, two entities may exhibit multiple entity relationships based on the extracted metadata. In some embodiments, generated lineage information may retain all of these entity relationships. In other embodiments, redundant entity relationships may be discarded based on defined priority level of the relationships (e.g., data flow>control flow>logical/physical, etc.).

The example process 500 continues at step 510 with inferring design-time information based on the extracted metadata. In some embodiments, the inferred design-time information may be based at least in part on lineage information generated based on the extracted metadata.

Recall that "design-time information" in this context refers to any information regarding the design of a system in general (e.g., computing devices, services, file systems, etc.) configured to store and process the data, the design of applications of the system (e.g., jobs, workflows, projects, etc.) to process data, and/or any other design-time information. For example, design-time information may include information on tables (and associated columns) utilized to structure the data (e.g., schema), information on jobs (e.g., job resource objects) utilized to execute jobs on the data, information on workflows (e.g., job sequences, workflow definition objects, etc.) utilized to perform sequences of jobs, information on projects or applications that make use of the data processing, information on services utilized to process data, information on resources (e.g., physical devices, software, etc.) utilized to process data, etc. In some embodiments, design-time information may include design-time artifacts that are generated and/or utilized by system components to process data. For example, project build automation tools such as Apache Maven™ generate artifacts at design-time that are used by the project to process data. In the specific context of Apache Maven™ projects, design-time artifacts may include source and binary code distributions, Java™ archives (JARs), web application resource archives (WARS), and/or other types of files or archives of files.

A metadata system 160 implemented, for example, as shown in FIG. 4B, may leverage domain knowledge as well as specific information regarding the architecture of the computing cluster 135 in order to infer design-time information based on extracted runt-time metadata and/or data lineage information based on the extracted run-time metadata. For example, the metadata system 160 may be configured to analyze metadata in a specific domain context (e.g., Apache Hadoop™) and/or may gain insight into the architecture of the computing cluster through communicating with the cluster manager server 315, for example, as previously described with respect to FIG. 4B.

Recreating Design-Time Elements

Figure 6:
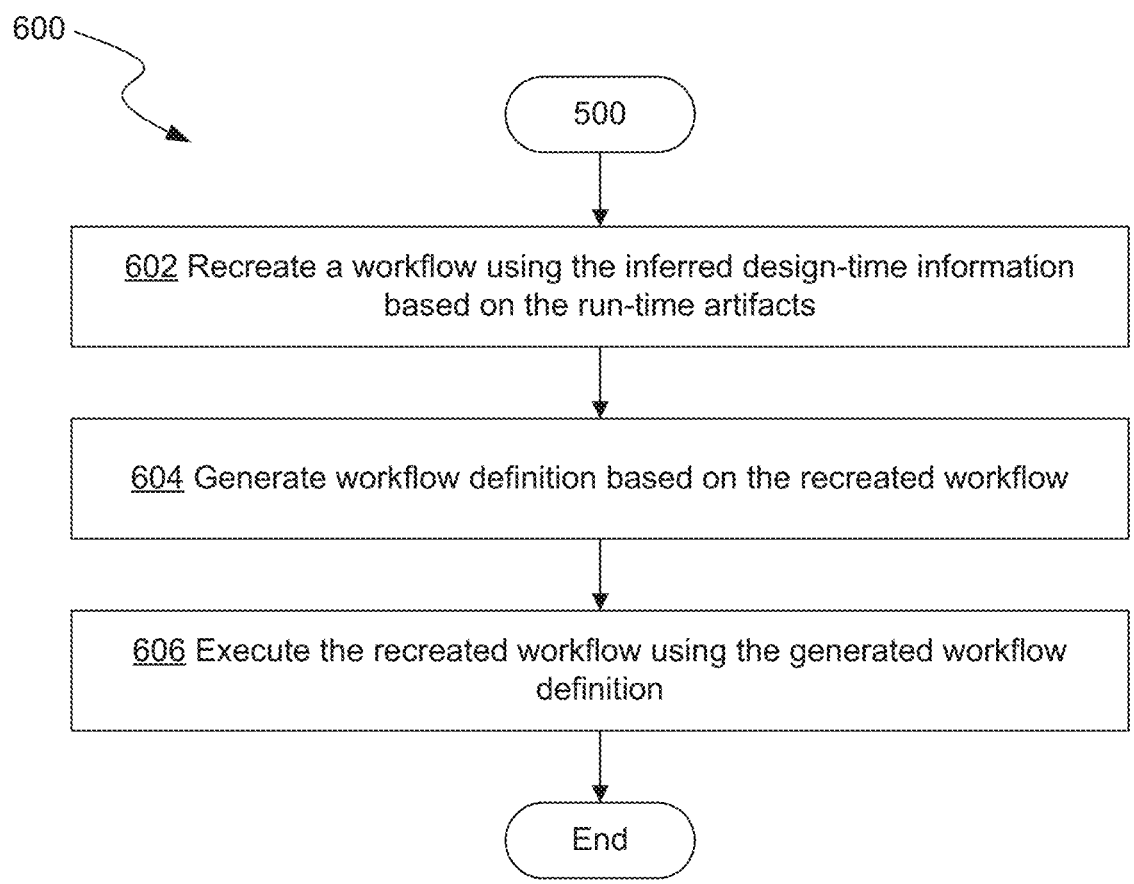
FIG. 6 is a flow chart that describes an example process for recreating a workflow based on extracted run-time metadata.

In some embodiments, a metadata system 160 may be configured to recreate design-time elements (e.g., workflows) based on the inferred design-time information. FIG. 6 shows a flow chart describing an example process 600 for recreating a design-time element such as a workflow based on the extracted run-time metadata. One or more steps of the example process 600 may be performed by any one or more of the components of the example processing system 1100 described with respect to FIG. 11. For example, the example process 600 depicted in FIG. 6 may be represented in instructions stored in memory that are then executed by a processing unit. The process 600 described with respect to FIG. 6 is an example provided for illustrative purposes and is not to be construed as limiting. Other processes may include more or fewer steps or may perform steps in a different order than depicted in FIG. 6 while remaining within the scope of the present disclosure. Note that the example process 600 is described in the context of recreating workflows but may similarly be applied to recreating other types of design-time elements.

As indicated in FIG. 6, the example process may continue from the example process 500 of FIG. 5. The example process 600 begins at step 602 with recreating a workflow based on the inferred design-time information. The workflow is recreated in that it is generated after having been run based at least in part on metadata generated when running the workflow. In other words, recreating a workflow includes determining a structure or design of the workflow based on the inferred design-time information. The structure or design of the workflow may include identification of the data processed according to the work, data processing jobs included in the workflow, sequencing and/or scheduling of the data processing jobs, the output generated by the workflow, etc. A workflow in this context may be a heterogeneous workflow representing a sequence of jobs performed using various types of services in computing cluster 135. For example, a recreated workflow in Apache Hadoop™ may include a sequence of multiple MapReduce™ jobs, Apache Hive™ jobs, Apache Impala™ jobs, etc.

Figure 7:
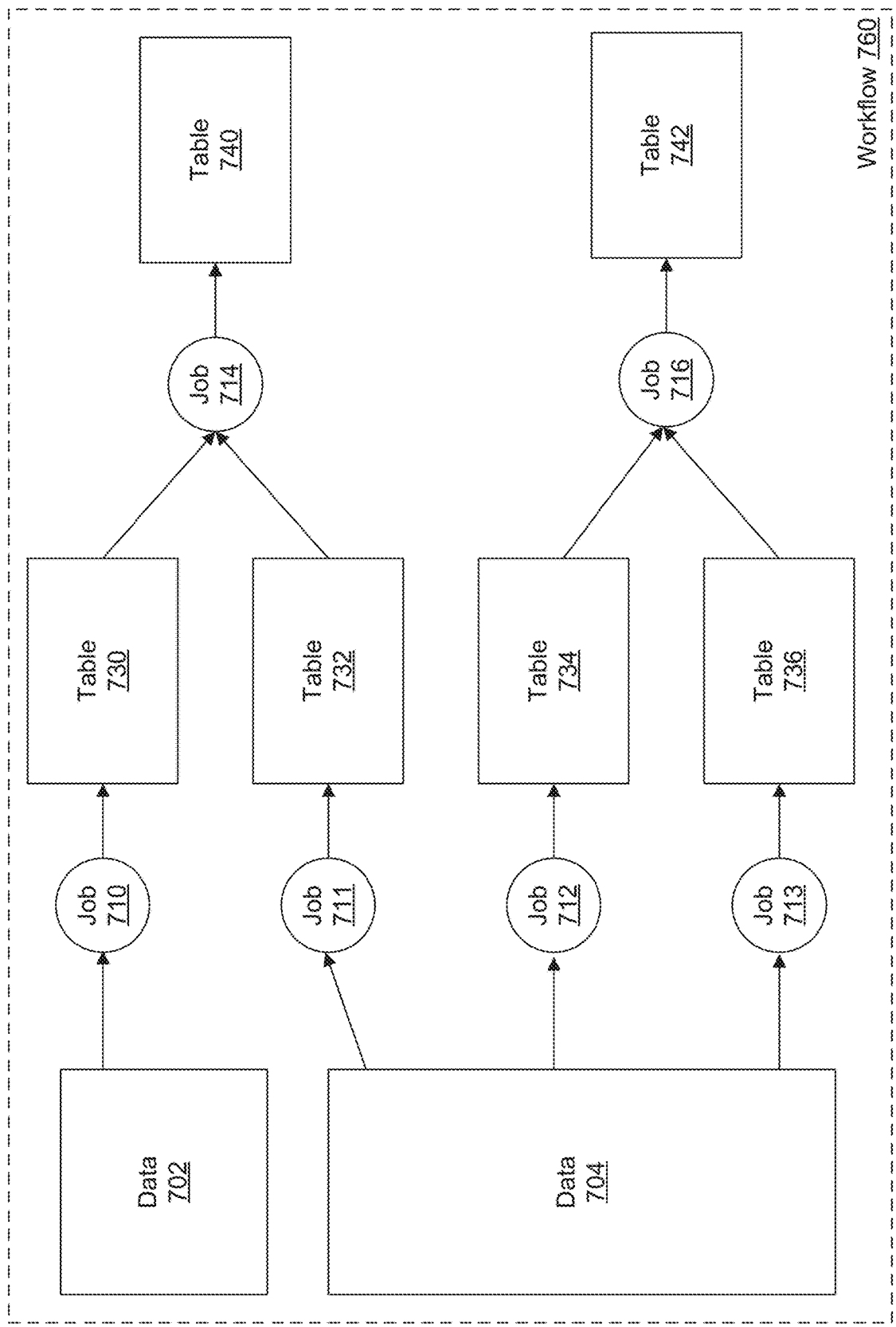
FIG. 7 is a diagram illustrating an example workflow including multiple jobs.

Consider the example scenario depicted in FIG. 7. FIG. 7 shows an example workflow 760 applied to process data from two data sources 702 and 704 to produce two tables 740 and 742. The two tables 740, 742 may represent reports that are produced periodically (e.g., ever day) by an enterprise business department. In the illustrative example, the two tables 740, 742 are generated by performing multiple jobs (in some cases queries) on the data from sources 702, 704. Specifically, in this example, a job 710 is executed using source data 702 to produce an temporary intermediate table 730 and jobs 711, 712, and 713 are executed using source data 704 to produce temporary intermediate tables 732, 734, and 736. A job 714 is then executed using temporary intermediate tables 730 and 732 to produce the first table 740 and a job 716 is executed using temporary intermediate tables 734 and 736.

As previously mentioned, the workflow 760 may be heterogeneous, meaning that the multiple jobs 710-716 involved in the workflow 760 may have been performed by multiple different services such as MapReduce™, Apache Hive™ Apache Impale™, etc. Each of these services may have kept a record (e.g., a log) of jobs performed and the parameters of such jobs; however, the structure of the workflow would otherwise be lost after processing. In other words, without the techniques described herein, the record of the workflow would appear to be a set of jobs 710-716 performed but with no information on how the jobs related to each other. Instead, by utilizing the run-time metadata generated during execution of the jobs (as previously described) design-time information can be inferred and design-time elements recreated. For example, the workflow 760 can be recreated by metadata generated by the one or more services (e.g., MapReduce™, Apache Hive™, Apache Impala™, etc.) executing the jobs 710-716. In an embodiment, certain design-time information (e.g., relationships, dependencies, sequencing, etc. between the jobs 710-716) can be inferred, for example, by generating and analyzing lineage information associated with the data (as previously described). In some embodiments, inferring the design-time information, for example, to recreate a workflow such as workflow 760 may involve analyzing multiple data lineages, if necessary.

Returning to FIG. 6, in some embodiments, example process 600 may continue with generating information based on the recreated workflow, for example, to enable execution of the recreated workflow again in the computing cluster 135. For example, in some embodiments, example process 600 may involve generating at step 604 a workflow definition based on the recreated workflow. For example, the workflow definition may be in the form of a configuration element such as an Extensible Markup Language (XML) file that can be utilized by a workflow engine (e.g., Apache Oozie™) to at step 606 execute the workflow in the computing cluster 135.

Versioning Design-Time Elements

In some embodiments, a metadata system 160 may be configured to infer previous versions of design-time elements at various points in time based on run-time metadata. As previously mentioned, in a data processing system implementing a bottom up "schema on read" approach (e.g., using Apache Hadoop™), work on the data may be often be ad hoc and exploratory in nature. In other words, since the schema are not predefined, users may run several workflow iterations to process their data before arriving at a set of desired results. The multiple iterations of various design-time elements such as individual jobs or workflows can therefore be inferred and recreated, for example, by applying previously described processes.

In some embodiments, versioning of design-time elements such as jobs, workflows, tables, files, etc. may include inferring some logical connection between the elements. Consider again the previously described scenario involving a first job execution with properties A (executed at time t1), a second job execution with properties B (executed at time t1), and a third job execution with properties C (executed at time t1). Without further information, the three jobs may appear unrelated; however, analyzing the entity properties of the three jobs may reveal that the three jobs represent three different versions of the "same" job at different points in time. Accordingly, with this inference, the metadata system 160 can effectively look back in time at a previous version of a design-time element such as a job, workflow, table, file, etc. In some embodiments a previous version of a static element such as a table may be inferred by analyzing related dynamic elements such as operations. For example, a previous version of a table may be inferred by analyzing a current version of the table and one or more operations that were run to arrive at the current version of the table. Accordingly, with information regarding various operations performed at various points in time on various tables, the metadata system 160 may recreate various versions of the "same" table. This process may similarly be applied to recreate previous versions of a workflow comprising multiple jobs such as the example workflow 760 described with respect to FIG. 7.

Figure 8:
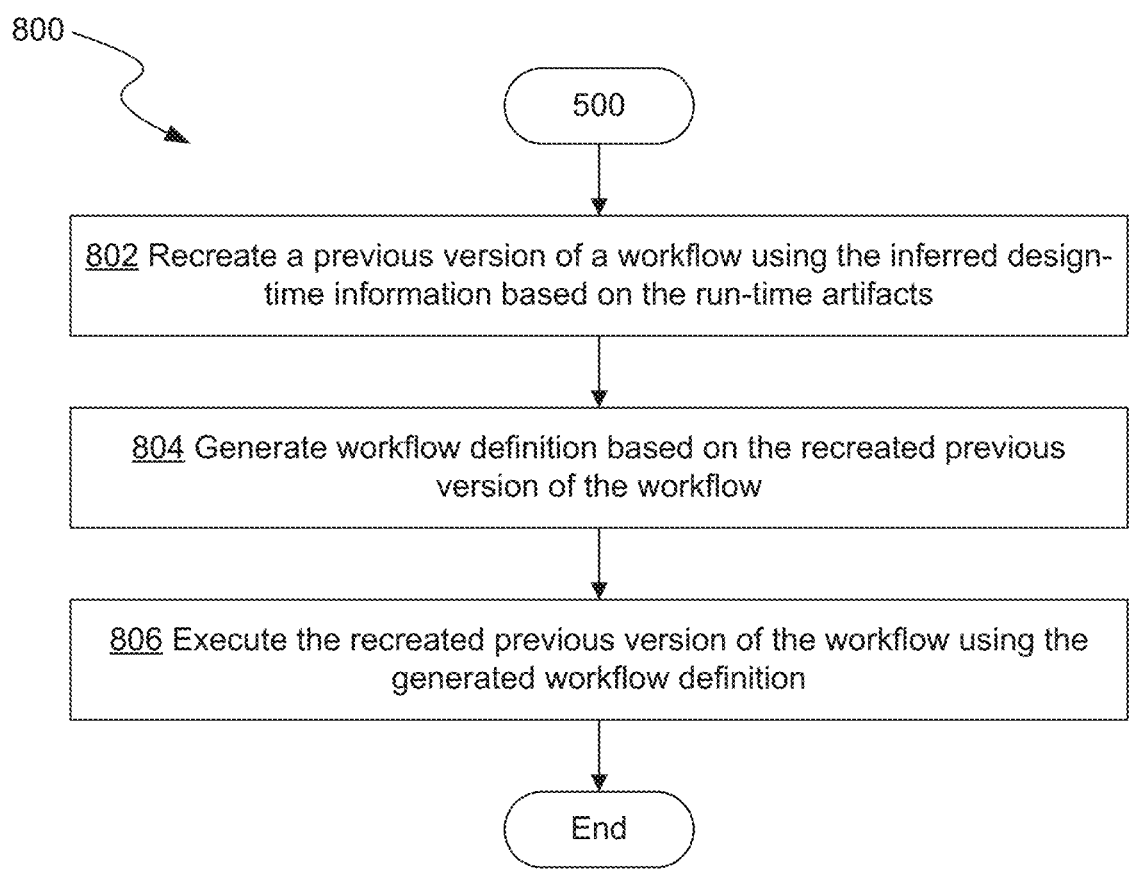
FIG. 8 is a flow chart that describes an example process for recreating a previous version of a workflow based on extracted run-time metadata.

FIG. 8 shows a flow chart describing an example process 800 for recreating previous versions of a design-time element such as a workflow based on the extracted run-time metadata. As with the example process 600, one or more steps of the example process 800 may be performed by any one or more of the components of the example processing system 1100 described with respect to FIG. 11. For example, the example process 800 depicted in FIG. 8 may be represented in instructions stored in memory that are then executed by a processing unit. The process 800 described with respect to FIG. 8 is an example provided for illustrative purposes and is not to be construed as limiting. Other processes may include more or fewer steps or may perform steps in a different order than depicted in FIG. 8 while remaining within the scope of the present disclosure. Note that the example process 800 is described in the context of recreating previous versions of workflows but may similarly be applied to recreating previous versions of other types of design-time elements. As indicated in FIG. 8, the example process may continue from the example process 500 of FIG. 5.

The example process 800 begins at step 802 with recreating a previous version of a workflow using inferred design-time information based at least in part on run-time artifacts. The example process continues at step 804 with generating a workflow definition of the recreated previous version of the workflow, for example, similar to as described with respect to step 604 in example process 600. The example process 800 continues at step 806 with executing the recreated previous version of the workflow using the workflow definition generated at step 804, for example, similar to as described with respect to step 606 in example process 600.

Optimizing Design-Time Elements Based on Inferred Design-Time Information

In some embodiments, a metadata system 60 may be configured to optimize certain design-time elements (e.g., jobs, workflows, tables, etc.). Recall that the metadata system 160 can be configured to leverage domain knowledge as well as specific information regarding the architecture of the computing cluster 135. This information can similarly be applied to optimize various design-time elements (e.g., jobs, workflows, tables, etc.) for operation in a particular environment. The metadata system may be configured to optimize (automatically or through recommendations) design-time elements to, for example, improve processing efficiency, data storage efficiency, or any other performance metrics. The process of optimizing a given workflow may involve re-designing the structure of the workflow, for example, by changing or modifying the data processed according to the workflow (e.g., selecting different stored data sets or transforming the stored data sets), changing the sequencing and/or scheduling of data processing jobs involved in the workflow; and/or changing one or more of the services utilized to store and process the data involved in the workflow (e.g., using Apache Impala™ instead of Apache Hive™). As an illustrative example, the metadata system 160 may analyze a recreated workflow involving multiple jobs and, using its domain knowledge and information regarding the architecture of computing cluster 135, determine that the same (or better) results can be achieved by, for example, applying a de-normalizing operation to join or flatten several tables involved in the workflow and migrate the tables to a different service (e.g., from Apache Hive™ to Apache Impala™). Notably, with its domain knowledge, information regarding the architecture of the computing cluster 135, and inferred design-time information, the metadata system is able to optimize heterogeneous design-time elements such as workflows involving multiple different services (e.g., MapReduce™, Apache Hive™, Apache Impala™, etc.) performing multiple different jobs.

Figure 9:
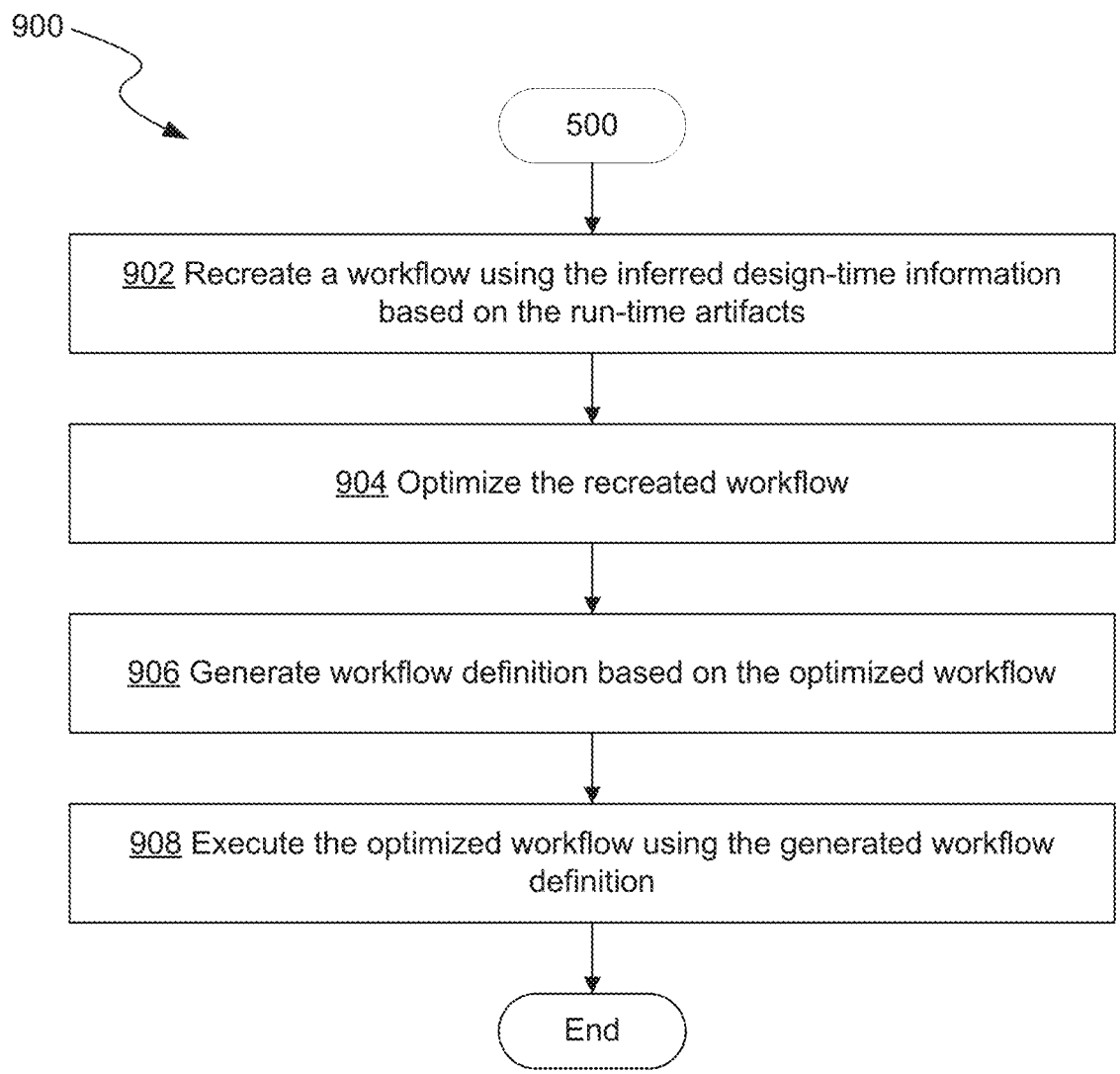
FIG. 9 is a flow chart that describes an example process for optimizing a workflow based on extracted run-time metadata.

FIG. 9 shows a flow chart describing an example process 900 for optimizing a design-time element such as workflow. As with the example process 600, one or more steps of the example process 900 may be performed by any one or more of the components of the example processing system 1100 described with respect to FIG. 11. For example, the example process 900 depicted in FIG. 9 may be represented in instructions stored in memory that are then executed by a processing unit. The process 900 described with respect to FIG. 9 is an example provided for illustrative purposes and is not to be construed as limiting. Other processes may include more or fewer steps or may perform steps in a different order than depicted in FIG. 9 while remaining within the scope of the present disclosure. Note that the example process 900 is described in the context of optimizing workflows but may similarly be applied to optimizing other types of design-time elements such as jobs, tables, etc. As indicated in FIG. 9, the example process may continue from the example process 500 of FIG. 5.

The example process 900 begins at step 902 with recreating a workflow using inferred design-time information based at least in part on run-time artifacts. The example process 900 continues at step 904 with optimizing the recreated workflow, for example, by using domain knowledge and information regarding the architecture of the computing cluster 135. The example process 900 continues at step 906 with generating a workflow definition of the optimized workflow, for example, similar to as described with respect to step 604 in example process 600. The example process 900 continues at step 908 with executing the optimized workflow using the workflow definition generated at step 906, for example, similar to as described with respect to step 606 in example process 600.

Example Data Lineage Visualizations

FIGS. 10A-10D show a series of example data lineage visualizations. The example data lineage visualizations depicted in FIGS. 10A-10D may be generated by a metadata system, based on generated lineage information as previously described. In some embodiments, data lineage visualizations may be displayed to users, for example, via clients 405. Such data lineage visualizations provides an efficient and intuitive may to convey information to a user (e.g., an administrator of the computing cluster or a data scientist) regarding the source of data being processed, the type of data being processed, operations performed on the data, movement of the data through the system, uses of the data, etc. For each data source, a data lineage visualization may be generated to display, down to the column level within that data source, what the precise upstream data sources were, the transforms performed to produce it, and the impact that data has on downstream artifacts.

Figure 10A:
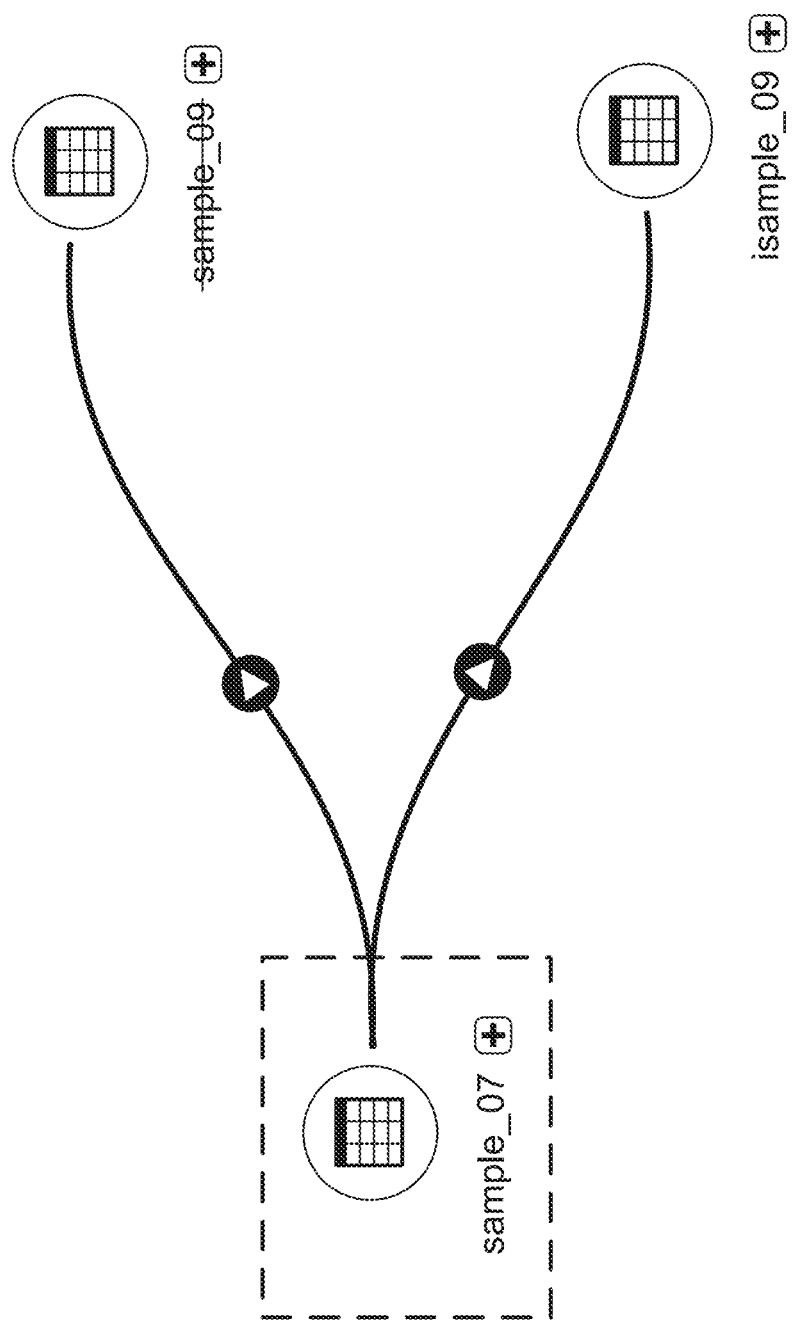
FIGS. 10A-10D show a series of example data lineage diagram visualizations.

FIG. 10A shows an example visualization of a simple data lineage. The simple data lineage depicted in FIG. 10A shows several entities linked based on entity relationships. Specifically, the simple data lineage shows dataflow links (indicated by the lines) between a sample_07 table, a sample_09 table and a isample_09 table. Specifically, as shown in FIG. 10A, the example visualization is in the form of a data linage diagram that includes multiple graphical entity nodes (or icons) representative of underlying entities. For example, each of the graphical entity nodes depicted in FIG. 10 may be representative of tables involved in a data processing flow. As is shown in FIG. 10D, other data lineage diagrams may include graphical entity nodes representative of other types of entities (e.g., jobs, queries, templates, etc.). The data lineage diagram shown in FIG. 10 further includes graphical edges linking the graphical entity nodes that are indicative of relationships between the entities represented by the graphical entity nodes. For example, the graphical edges depicted in the data lineage diagram of FIG. 10A may represent a data flow relationship between the tables represented by the graphical entity nodes.

Figure 10B:
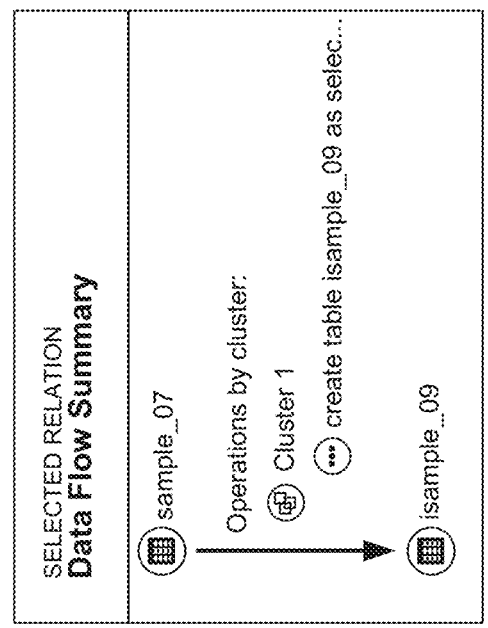
Figure 10B:
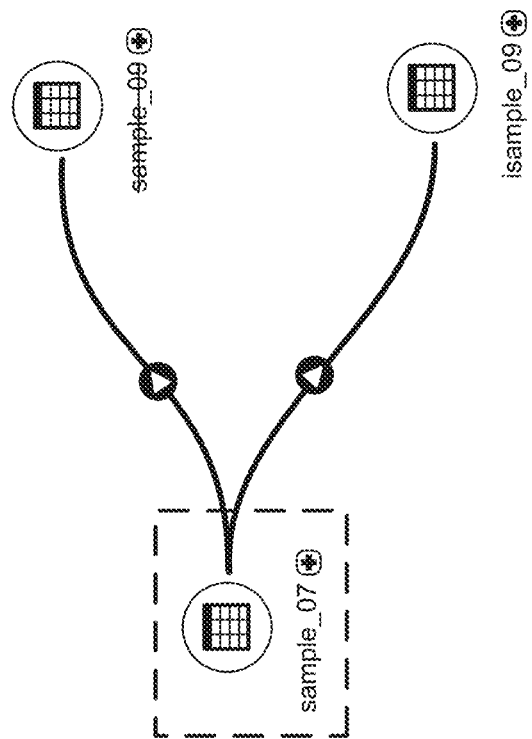

FIG. 10B shows another view of the data lineage visualization of FIG. 10A, but with additional information displayed regarding operations associated with the data flow relationship. In an embodiment, the operation information can be displayed to a user in response to the user selecting one or more of the graphical edges in the data lineage visualization. Here, a user has selected the graphical edge representative of the data flow link between the sample_07 table and the isample_09 table. As shown in FIG. 10B, the operation information indicates that the isample_09 table was created from the sample_07 table in cluster 1.

Figure 10C:
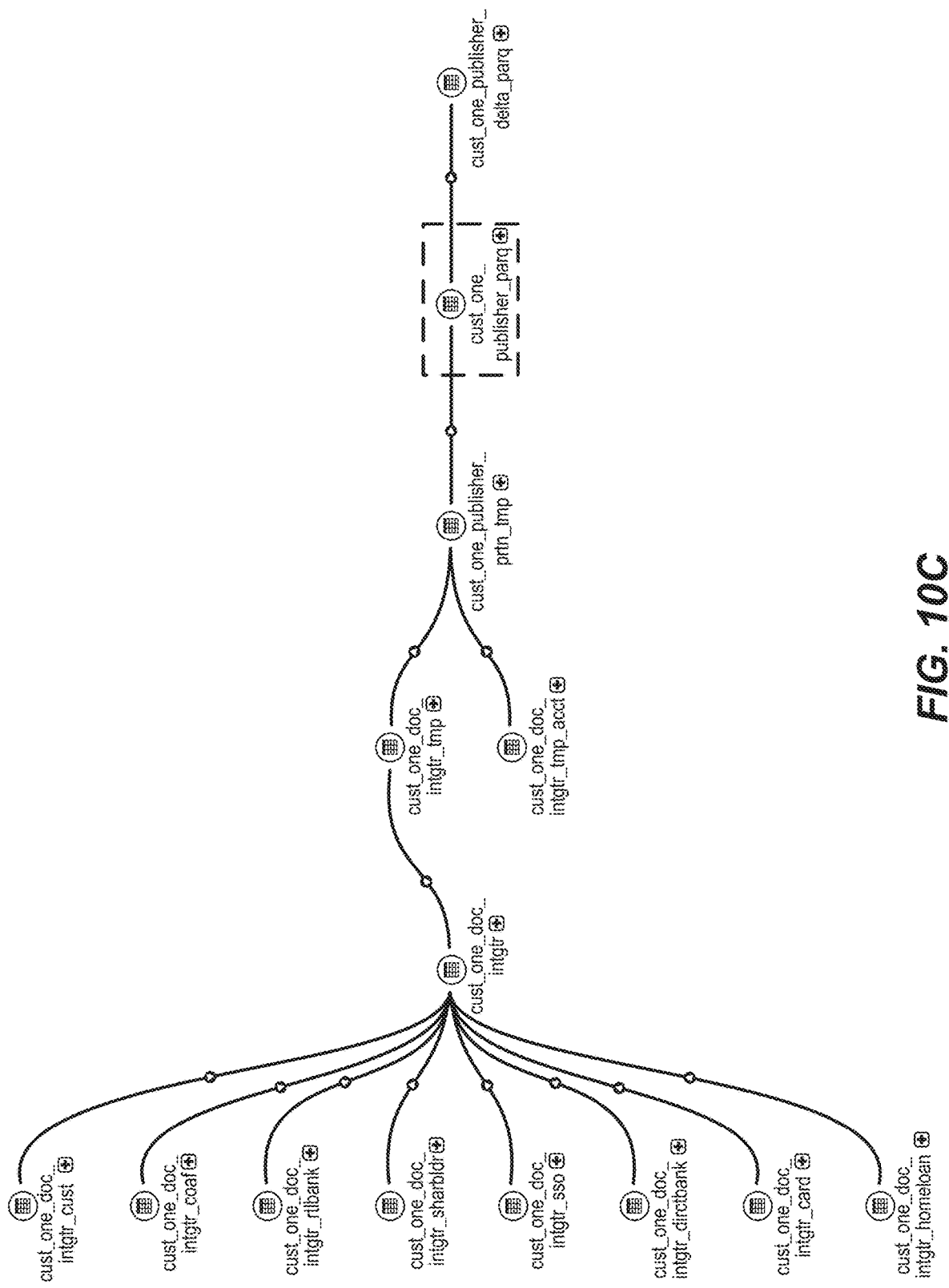
Figure 10D:
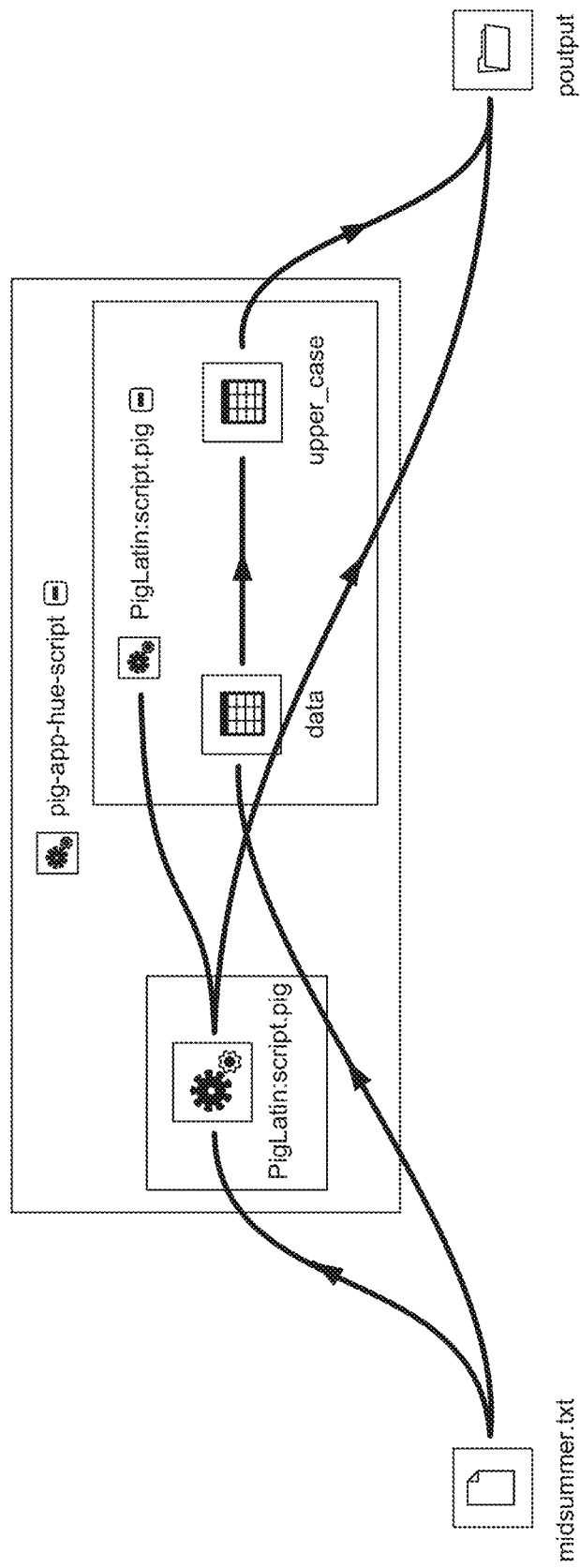

FIG. 10C shows an example visualization of a more complex real-world data lineage. As indicated shown in FIG. 10C, data lineage in a given system may involve many entities and entity relationships.

FIG. 10D shows another example visualization of a more complex data lineage that includes entities other than tables. The example data lineage depicted in FIG. 10D shows the processing of several tables generated form a source data file using a script (e.g., an Apache Pig™ script) to generate an output. As shown in FIG. 10C, the data lineage visualization may display data flow relationship links (e.g., between the source file and generated tables) as well as instance or parent-child relationships (e.g., between a script template and script instance based on the template). For example, in some embodiments, a graphical entity node representative of a parent entity may be expanded, in response to user interaction, to display a graphical entity node representative of a child entity to the patent.

The example data lineage visualizations depicted in FIGS. 10A-10D are provided for illustrative purposes and are not to be construed as limiting. A person having ordinary skill will recognize the lineage information may be presented (visually or otherwise) in using other arrangements.

Example Computer Implementation

Figure 11:
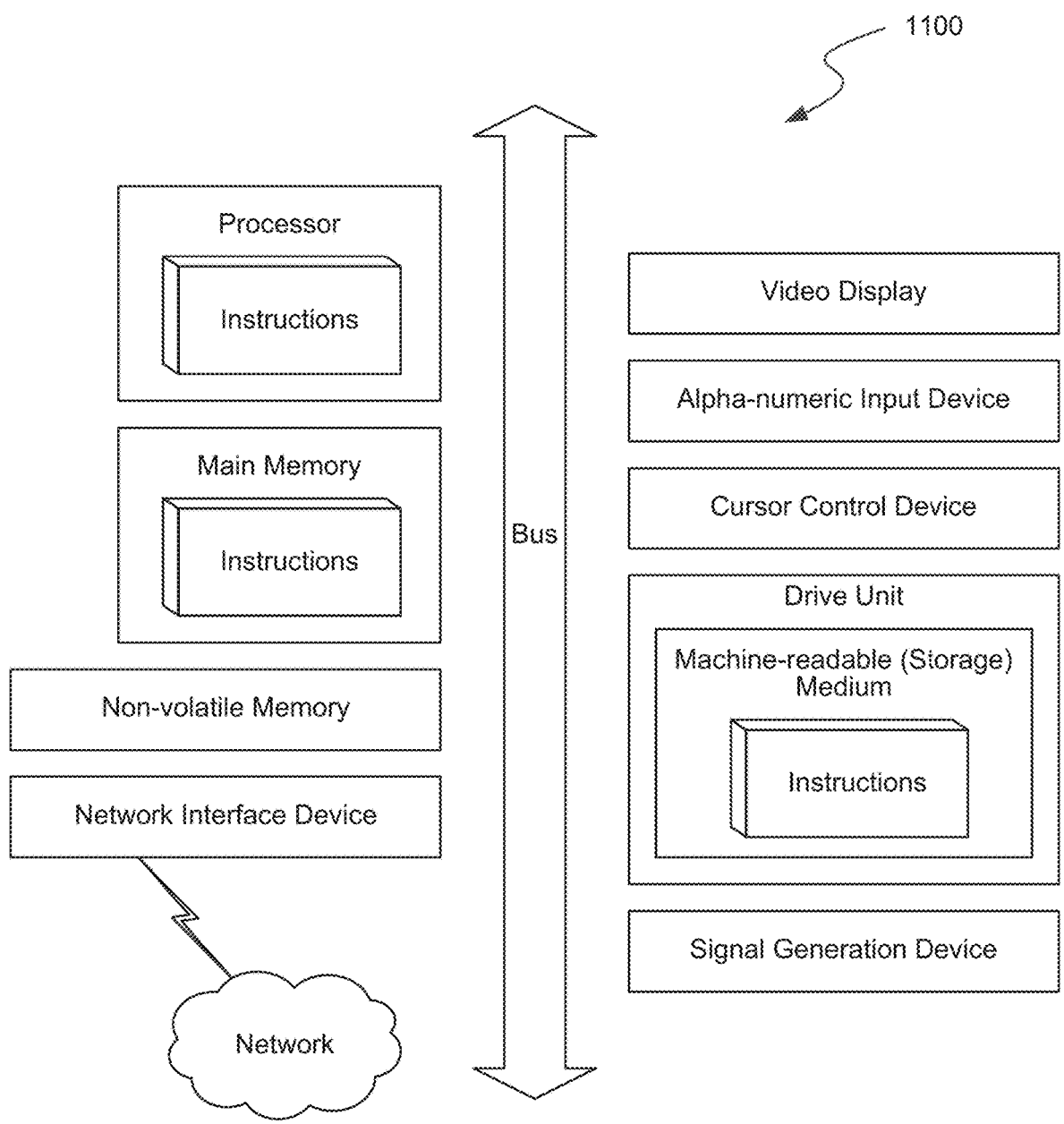
FIG. 11 shows a diagrammatic representation of a machine in the example form of a computer system within which a set of instructions, for causing the machine to perform any one or more of the techniques discussed herein, may be executed.

FIG. 11 shows a diagrammatic representation of a machine in the example form of a computer system within which a set of instructions, for causing the machine to perform any one or more of the techniques discussed herein, may be executed.

In the example of FIG. 11, the computer system 1100 includes a processor, memory, non-volatile memory, and an interface device. Various common components (e.g., cache memory) are omitted for illustrative simplicity. The computer system 1100 is intended to illustrate a hardware device on which any of the components depicted FIGS. 1-4B (and any other components described in this specification) can be implemented. The computer system 1100 can be of any applicable known or convenient type. The components of the computer system 1100 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (PRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 11 reside in the interface.

In operation, the computer system 1100 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

DISCLAIMERS

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct a more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to" As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A computer-implemented method comprising:
   extracting, by a metadata system, metadata from one or more services, the one or more services for storing and processing data in a distributed computing cluster, the metadata including run-time artifacts generated at the time of processing the data, by the one or more services, according to a workflow including a plurality of data processing jobs;
   processing, by the metadata system, the extracted metadata to identify a plurality of entities involved in the processing of the data according to the workflow and relationships between the identified plurality of entities;
   generating, by the metadata system, data lineage information based on the identified plurality of entities and relationships between the identified plurality of entities, the data lineage information indicative of a path of data through the identified plurality of entities involved in the processing of the data according to the workflow;

inferring, by the metadata system, design-time information associated with the workflow based on the generated data lineage information, the design-time information indicative of a design of any of the distributed computing cluster, the workflow, or the plurality of data processing jobs included in the workflow;

optimizing, by the metadata system, a structure of the workflow based on the inferred design-time information; and generating, by the metadata system, an optimized workflow definition based on the optimized structure of the workflow, the optimized workflow definition being executable in the distributed computing cluster to process the data according to a plurality of data processing jobs of the optimized structure of the workflow.

2. The method of claim 1, further comprising:
determining, by the metadata system, the structure of the workflow based on the inferred design-time information.

3. The method of claim 1, further comprising:
determining, by the metadata system, a structure of a previous version of the workflow based on the inferred design-time information.

4. The method of claim 1, wherein the inferred design-time information includes information regarding any one or more of:
data processed by the workflow;
operations performed on the data as part of the workflow; or
services of the distributed computing cluster utilized to perform the operations on the data.

5. The method of claim 1, wherein inferring design-time information includes:
inferring, by the metadata system, based on the data lineage information, logical connections between one or more of the plurality of data processing jobs comprising the workflow.

6. The method of claim 5, wherein logical connections between data processing jobs may include any one or more of:
sequencing of data processing jobs;
scheduling of data processing jobs;
dependencies between data processing jobs; or
common parameters between data processing jobs.

7. The method of claim 1, wherein optimizing the structure of the workflow includes any one or more of:
changing the data processed according to the workflow;
changing the sequencing and/or scheduling of data processing jobs involved in the workflow; or
changing one or more of the services utilized to store and process the data involved in the workflow.

8. The method of claim 1, wherein the structure of the workflow is optimized to improve data processing efficiency and/or data storage efficiency.

9. The method of claim 1, further comprising:
receiving, by the metadata system, from a management system associated with the distributed computing cluster, service information regarding the one or more services operating in the distributed computing cluster.

10. The method of claim 9, wherein the received service information includes identifications of the one or more services and parameters associated with the one or more services.

11. The method of claim 1, further comprising:
configuring, by the metadata system, the one or more services to log and transmit the metadata to the metadata system.

12. The method of claim 1, further comprising:
causing, by the metadata system, a management system associated with the distributed computing cluster to configure the one or more services to log and transmit the metadata to the metadata system.

13. The method of claim 1, wherein the workflow is heterogeneous, the heterogeneous workflow including a plurality of different types of data processing jobs performed on the data by a plurality of different types of services in the distributed computing cluster.

14. The method of claim 1, further comprising:
determining, by the metadata system, if the workflow involves processing of personally identifiable information (PII) based on the inferred design-time information.

15. The method of claim 1, further comprising:
generating, by the metadata system, a data lineage visualization based on the generated data lineage information; and
causing display, by the metadata system, of the data lineage visualization.

16. The method of claim 15, wherein the data lineage visualization includes:
a first graphical entity node representative of a first entity of the identified plurality of entities involved in the processing of data according to the workflow;
a second graphical entity node representative of a second entity of the identified plurality of entities involved in the processing of data according to the workflow; and
a graphical edge visually linking the first graphical entity node to the second graphical entity node, the graphical edge indicative of any of a data flow relationship, a parent-child relationship, a logical-physical relationship, or a control relationship between the first entity and the second entity.

17. The method of claim 16, wherein the graphical edge includes an interactive element, which when interacted with by a user, displays information regarding the relationship between the first entity and the second entity.

18. The method of claim 1, wherein the data lineage visualization includes:
a plurality of graphical entity nodes representative of a least some of the plurality of the identified entities involved in the processing of data according to the workflow, each of the plurality of graphical entity nodes visually linked to one or more of the other plurality of graphical entity nodes based on the identified relationships between the plurality of entities.

19. The method of claim 18, wherein at least some of the plurality of graphical entity nodes include interactive elements, which when interacted with by a user, display information regarding the represented entities.

20. The method of claim 1, wherein the plurality of entities include any one or more of a file, a directory, a table, a script, a query template, a query execution object, a job template, or a job execution object.

21. The method of claim 1, wherein the identified relationships between entities include any one or more of a data flow relationship, a parent-child relationship, a logical-physical relationship, a control relationship.

22. The method of claim 1, further comprising:
indexing, by the metadata system, the received metadata; and
storing, by the metadata system, the indexed metadata in a metadata repository.

23. A non-transitory computer readable medium storing instructions, execution of which by a computer system, cause the computer system to:
- extract metadata from one or more services operating in the distributed computing cluster, the one or more services for storing and processing data in the distributed computing cluster, the metadata including run-time artifacts generated at the time of processing the data, according to a workflow including a plurality of data processing jobs;
- process the extracted metadata to identify a plurality of entities involved in the processing of the data according to the workflow and relationships between the identified plurality of entities;
- generate data lineage information based on the identified plurality of entities and relationships between the identified plurality of entities, the data lineage information indicative of a path of data through the identified plurality of entities involved in the processing of the data according to the workflow;
- infer design-time information associated with the workflow based on the generated data lineage information, the design-time information indicative of a design of any of the distributed computing cluster, the workflow, or the plurality of data processing jobs included in the workflow;
- optimize a structure of the workflow based on the inferred design-time information; and
- generate an optimized workflow definition based on the optimized structure of the workflow, the optimized workflow definition being executable in the distributed computing cluster to process the data according to a plurality of data processing jobs of the optimized structure of the workflow.

24. The non-transitory computer readable medium of claim 23, storing further instructions, execution of which by the computer system, cause the computer system to further:
- determine the structure of the workflow based on the inferred design-time information.

25. The non-transitory computer readable medium of claim 23, storing further instructions, execution of which by the computer system, cause the computer system to further:
- generate a data lineage visualization based on the generated data lineage information; and
- cause display of the data lineage visualization;
- wherein the data lineage visualization includes:
  - a first graphical entity node representative of a first entity of the identified plurality of entities involved in the processing of data according to the workflow;
  - a second graphical entity node representative of a second entity of the identified plurality of entities involved in the processing of data according to the workflow; and
  - a graphical edge visually linking the first graphical entity node to the second graphical entity node, the graphical edge indicative of any of a data flow relationship, a parent-child relationship, a logical-physical relationship, or a control relationship between the first entity and the second entity.

26. A metadata server comprising:
- one or more processors; and
- a memory having instructions stored thereon, which when executed by the one or more processors, cause the metadata server to:
  - extract metadata from one or more services operating in the distributed computing cluster, the one or more services for storing and processing data in the distributed computing cluster, the metadata including run-time artifacts generated at the time of processing the data, according to a workflow including a plurality of data processing jobs;
  - process the extracted metadata to identify a plurality of entities involved in the processing of the data according to the workflow and relationships between the identified plurality of entities;
  - generate data lineage information based on the identified plurality of entities and relationships between the identified plurality of entities, the data lineage information indicative of a path of data through the identified plurality of entities involved in the processing of the data according to the workflow;
  - infer design-time information associated with the workflow based on the generated data lineage information, the design-time information indicative of a design of any of the distributed computing cluster, the workflow, or the plurality of data processing jobs included in the workflow;
  - optimize a structure of the workflow based on the inferred design-time information; and
  - generate an optimized workflow definition based on the optimized structure of the workflow, the optimized workflow definition being executable in the distributed computing cluster to process the data according to a plurality of data processing jobs of the optimized structure of the workflow.

27. The metadata sever of claim 26, wherein the memory has further instructions stored thereon, which when executed by the one or more processors, cause the metadata server to further:
- determine the structure of the workflow based on the inferred design-time information.

28. The metadata sever of claim 26, wherein the memory has further instructions stored thereon, which when executed by the one or more processors, cause the metadata server to further:
- generate a data lineage visualization based on the generated data lineage information; and
- cause display of the data lineage visualization;
- wherein the data lineage visualization includes:
  - a first graphical entity node representative of a first entity of the identified plurality of entities involved in the processing of data according to the workflow;
  - a second graphical entity node representative of a second entity of the identified plurality of entities involved in the processing of data according to the workflow; and
  - a graphical edge visually linking the first graphical entity node to the second graphical entity node, the graphical edge indicative of any of a data flow relationship, a parent-child relationship, a logical-physical relationship, or a control relationship between the first entity and the second entity.

* * * * *

UNITED STATES PATENT AND TRADEMARK OFFICE
CERTIFICATE OF CORRECTION

PATENT NO. : 10,929,173 B2  
APPLICATION NO. : 16/667609  
DATED : February 23, 2021  
INVENTOR(S) : Vikas Singh et al.

Page 1 of 2

It is certified that error appears in the above-identified patent and that said Letters Patent is hereby corrected as shown below:

On the Title Page

In item (74), in Column 2, in "Attorney, Agent or Firm", Line 1, delete "Cole" and insert -- Coie --, therefor.

In the Specification

In Column 4, Lines 38-39, delete "that that" and insert -- that --, therefor.

In Column 5, Line 32, after "EMC" insert -- Isilon™, --.

In Column 5, Line 44, delete "DataNode b," and insert -- DataNode_b, --, therefor.

In Column 10, Line 63, delete "MapReduce™" and insert -- MapReduce™, --, therefor.

In Column 12, Line 30, after "Based" insert -- on --.

In Column 15, Line 45, delete "(WARS)," and insert -- (WARs), --, therefor.

In Column 16, Line 54, delete "Hive™" and insert -- Hive™, --, therefor.

In Column 16, Line 54, delete "Impale™," and insert -- Impala™, --, therefor.

In Column 18, Line 34, delete "60" and insert -- 160 --, therefor.

In Column 19, Line 63, delete "linage" and insert -- lineage --, therefor.

In Column 21, Line 7, delete "(PRAM)" and insert -- (DRAM) --, therefor.

In Column 23, Line 46, delete "to"" and insert -- to." --, therefor.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,929,173 B2

In the Claims

In Column 26, Line 44, in Claim 18, delete "of a" and insert -- of at --, therefor.

In Column 28, Line 34, in Claim 27, delete "sever" and insert -- server --, therefor.

In Column 28, Line 40, in Claim 28, delete "sever" and insert -- server --, therefor.